United States Patent
Jhawar et al.

(10) Patent No.: US 12,498,836 B1
(45) Date of Patent: Dec. 16, 2025

(54) SYSTEMS AND METHODS FOR DEVICE CONTROL USING NATURAL VOICE COMMANDS, MOTION-BASED GESTURE RECOGNITION, AND TOKENIZED PROCESSING TO PROVIDE UNIVERSAL APPLICATION CONTROL

(71) Applicant: AUGMENTALIS INC., Encinitas, CA (US)

(72) Inventors: Manoj Kumar Jhawar, Encinitas, CA (US); Aman Manoj Jhawar, San Marcos, CA (US)

(73) Assignee: AUGMENTALIS INC., Encinitas, CA (US)

( * ) Notice: Subject to any disclaimer, the term of this patent is extended or adjusted under 35 U.S.C. 154(b) by 0 days.

(21) Appl. No.: 19/271,494

(22) Filed: Jul. 16, 2025

Related U.S. Application Data

(60) Provisional application No. 63/672,935, filed on Jul. 18, 2024.

(51) Int. Cl.
   G06F 3/0481 (2022.01)
   G06F 3/01 (2006.01)
   (Continued)

(52) U.S. Cl.
   CPC ............ *G06F 3/0481* (2013.01); *G06F 3/011* (2013.01); *G06F 3/013* (2013.01); *G06F 3/017* (2013.01); *G06F 3/167* (2013.01); *G06F 40/284* (2020.01)

(58) Field of Classification Search
   CPC .......... G06F 3/011; G06F 3/017; G06F 3/013; G06F 3/048–0486; G06F 40/284; G06N 20/00
   See application file for complete search history.

(56) References Cited

U.S. PATENT DOCUMENTS

| 8,442,820 B2 | 5/2013 | Kim et al. |
| 9,031,847 B2 | 5/2015 | Sarin et al. |

(Continued)

FOREIGN PATENT DOCUMENTS

| CN | 111209861 B | 3/2022 |
| WO | WO2015116972 A1 | 8/2015 |

OTHER PUBLICATIONS

Android Accessibility Help, "Get started with Voice Access spoken commands," Google Support (2025), https://support.google.com/accessibility/android/answer/6151848?hl=en, 2 pages.

(Continued)

*Primary Examiner* — Patrick F Marinelli
(74) *Attorney, Agent, or Firm* — Sheppard, Mullin, Richter & Hampton LLP

(57) ABSTRACT

The disclosure describes techniques for integrating natural voice command and motion-based gesture recognition, a tokenizer, and a LLM to enable hands-free control of computing devices without requiring specialized programming. In some implementations, a method includes: obtaining data associated with input by a user at an application interface indicating an intent to control the application interface; tokenizing, using a tokenizer, the data associated with the input by the user to create tokenized user input data; obtaining tokenized UI element data corresponding to a tokenized record of actionable UI elements associated with the application interface; generating, using a LLM, based at least on the tokenized UI element data and the tokenized user input data, events to inject into the application interface to control one or more of the actionable UI elements; injecting the events into the application interface; and providing feedback to the user in accordance with injecting the events.

19 Claims, 9 Drawing Sheets

(51) Int. Cl.
  *G06F 3/16* (2006.01)
  *G06F 40/284* (2020.01)

(56) References Cited

U.S. PATENT DOCUMENTS

| | | | |
|---|---|---|---|
| 9,285,589 B2 | 3/2016 | Osterhout et al. | |
| 9,733,895 B2 | 8/2017 | Kim et al. | |
| 9,842,589 B2 | 12/2017 | Inutsuka | |
| 9,911,418 B2 | 3/2018 | Chi | |
| 10,474,961 B2 | 11/2019 | Brigham et al. | |
| 10,656,806 B2* | 5/2020 | Jhawar | G06F 3/016 |
| 10,732,721 B1 | 8/2020 | Clements | |
| 10,788,902 B2 | 9/2020 | Kawano et al. | |
| 10,908,419 B2 | 2/2021 | Gross et al. | |
| 11,068,932 B2* | 7/2021 | Shen | H04L 51/04 |
| 11,200,900 B2 | 12/2021 | Smith | |
| 11,393,472 B2 | 7/2022 | Chakladar et al. | |
| 11,972,095 B2 | 4/2024 | Klein et al. | |
| 12,008,026 B1 | 6/2024 | Sanz et al. | |
| 12,183,323 B2 | 12/2024 | Fu et al. | |
| 12,411,699 B2* | 9/2025 | Jacob | G06F 9/451 |
| 2011/0071830 A1 | 3/2011 | Kim et al. | |
| 2012/0016678 A1 | 1/2012 | Gruber et al. | |
| 2015/0002676 A1 | 1/2015 | Yoo | |
| 2019/0324613 A1* | 10/2019 | Jhawar | G06F 3/167 |
| 2020/0192493 A1 | 6/2020 | Wu et al. | |
| 2020/0204613 A1 | 6/2020 | Hatambeiki et al. | |
| 2021/0240783 A1 | 8/2021 | Ricci | |
| 2023/0128422 A1 | 4/2023 | Li et al. | |
| 2023/0168859 A1 | 6/2023 | Bao | |
| 2023/0245654 A1 | 8/2023 | Shrivastava et al. | |
| 2024/0029729 A1 | 1/2024 | Shetty | |
| 2024/0312345 A1 | 9/2024 | Ogawa | |
| 2024/0320444 A1* | 9/2024 | Maschmeyer | G06F 3/04845 |
| 2024/0362036 A1* | 10/2024 | Jacob | G06N 20/00 |
| 2024/0412720 A1 | 12/2024 | Vasylyev | |
| 2025/0029170 A1 | 1/2025 | Chachek et al. | |
| 2025/0060618 A1 | 2/2025 | Lee et al. | |
| 2025/0130636 A1 | 4/2025 | Zurauskas | |
| 2025/0148811 A1 | 5/2025 | Santoro et al. | |

OTHER PUBLICATIONS

Delgado, Carlos, "Artyom.js Library—A speech recognition, voice commands and speech synthesis javascript library," https://sdkcarlos.github.io/sites/artyom.html (2016), 17 pages.

"Dragon Professional v16: Premier speech-recognition for Windows 11 and 10," Nuance® Dragon® Professional v16 Data Sheet, Nuance Communications, Inc. (Dec. 2, 2022), https://www.nuance.com/asset/en_us/collateral/dragon/data-sheet/ds-dragon-professional-v16-en-us.pdf, 2 pages.

Hume, Tom, "Use Voice Access to control your Android device with your voice," Google Blog, The Keyword, Outreach and Initiative, Accessibility (Dec. 3, 2020), https://blog.google/outreach-initiatives/accessibility/voice-access-updates/, 3 pages.

IPhone User Guide, "Find out what Siri can do on iPhone" Apple Support (2025), https://support.apple.com/guide/iphone/find-out-what-siri-can-do-ipha48873ed6/ios.

Mortensen, Ditte Hvas, "How to Design Voice User Interfaces," Interaction Design Foundation (2020), https://www.interaction-design.org/literature/article/how-to-design-voice-user-interfaces?srsltid=AfmBOopBReuFaY-ORMVhildE1G7NaObUXai-RPSqPVMPyWZm83vVBLLL, 10 pages.

"RealWear Navigator™ 500 Series User Guide," RealWear, Inc., Version 1.2, (Jun. 1, 2022), https://support.realwear.com/hubfs/RealWear%20Navigator%20500%20User%20Guide%20v1.2%20English%20(2).pdf, 148 pages.

"RealWear Navigator® Z1: User Guide," RealWear, Inc., Rev03 (2024), https://support.realwear.com/hubfs/Z1%20User%20Guides/20240403%20RealWear%20NavZ1_UserGuide%20(English).pdf, 41 pages.

RealWear Inc. Website (2024), https://www.realwear.com/, 6 pages.

Vuzix Corporation Website (2025), https://www.vuzix.com/, 9 pages.

"Web Speech API," Mozilla, MDN Web Docs, Apr. 4, 2025, https://developer.mozilla.org/en-US/docs/Web/API/Web_Speech_API, 7 pages.

Zaheer, Sarah, "Advancing AR Interfaces Integrating Gesture, Voice, and Eye-Tracking for Enhanced Interaction," International Journal Research of Leading Publication (IJLRP), vol. 5, Issue 6, Jun. 2024, 12 pages.

* cited by examiner

Command Examples

| Voice Command | Touch Gesture Generated | Application Result |
|---|---|---|
| "Tap" | Single finger touch at gaze location | Button press, item selection |
| "Swipe left" | Horizontal drag gesture (left direction) | Navigate to next item/page |
| "Pinch to zoom" | Two-finger pinch with calculated spread | Zoom out of image/map |
| "Double tap" | Two rapid taps with precise timing | Zoom to fit, like/favorite action |
| "Long press menu" | Extended touch with pressure simulation | Context menu appears |
| "Rotate clockwise" | Two-finger rotation gesture | Image/object rotates right |

FIG. 8

SYSTEMS AND METHODS FOR DEVICE CONTROL USING NATURAL VOICE COMMANDS, MOTION-BASED GESTURE RECOGNITION, AND TOKENIZED PROCESSING TO PROVIDE UNIVERSAL APPLICATION CONTROL

CROSS-REFERENCE TO RELATED APPLICATIONS

The present application claims the benefit of U.S. Provisional Patent Application No. 63/672,935 filed on Jul. 18, 2024 and titled "Advanced Voice Operating System using Voice Commands and IMU based Headtracking to Mimic Touch Gestures with localized Natural Language Learning and Augmented Intelligence Assistant," which is incorporated herein by reference in its entirety.

SUMMARY

The technology described herein is directed to systems and methods that integrate natural voice command and motion-based gesture recognition, a tokenizer, and a LLM to enable hands-free control of computing devices without requiring specialized programming or predefined commands. Particular implementations are directed to integrating these components to provide universal application control and create intelligent workflows from visual content analysis.

In one embodiment, one or more non-transitory computer readable mediums store instructions that, when executed by one or more processors of a system, cause the system to perform operations comprising: obtaining data associated with input by a user at an application interface indicating an intent to control the application interface; tokenizing, using a tokenizer, the data associated with the input by the user to create tokenized user input data; obtaining tokenized user interface (UI) element data corresponding to a tokenized record of actionable UI elements associated with the application interface; generating, using a trained large language model (LLM), based at least on the tokenized UI element data and the tokenized user input data, one or more events to inject into the application interface to control one or more of the actionable UI elements; injecting the one or more events into the application interface to control the one or more actionable UI elements in accordance with the input by the user; and providing feedback to the user in accordance with injecting the one or more events into the application interface.

In some implementations, obtaining the tokenized user interface UI element data corresponding to the tokenized record of actionable UI elements associated with the application interface comprises: scraping the application interface to create the record of the actionable UI elements associated with the application interface; and tokenizing, using the tokenizer, the record of the actionable UI elements associated with the application interface to create the tokenized UI element data.

In some implementations, scraping the application interface to create the record of the actionable UI elements associated with the application interface comprises: identifying a first actionable UI element that does not have associated metadata in the application interface; identifying an action associated with the first actionable UI element; assigning a unique identifier to the first actionable UI element; and storing, in a datastore, the unique identifier and the action associated with the first actionable UI element.

In some implementations, the first actionable UI element is a UI element that can be invoked via an accessibility service of an operating system (OS) on which the application interface runs.

In some implementations, the operations further comprise: receiving, using a microphone of the system, a vocal command from the user to control the application interface; and converting the vocal command to vocal command text; and obtaining the data associated with input by the user comprises obtaining the vocal command text.

In some implementations, the data associated with the input by the user is fused input data; and obtaining the data associated with input by the user further comprises: obtaining user motion data in response to an inertial measurement unit (IMU) of the system detecting head motion of the user, or obtaining user gaze data in response to an eye tracking unit of the system detecting eye motion of the user; and fusing the vocal command text with the user motion data or gaze data to obtain the fused input data.

In some implementations, the one or more events to inject into the application interface to control one or more of the actionable UI elements comprise a plurality of events to inject into the application interface to control a plurality of the actionable UI elements; and injecting the one or more events into the application interface comprises: injecting the plurality of events into the application interface to control the plurality of actionable UI elements in accordance with the input by the user.

In some implementations, the plurality of events comprise a first event that is initiated by an OS on which the application interface runs, and is not interpretable by the application interface; and injecting the plurality of events comprises injecting, via the OS, the first event into the application interface.

In some implementations, the plurality of events further comprise a second event that is interpretable by the application interface; injecting the plurality of events further comprises injecting, via the application interface, the second event into the application interface.

In some implementations, the system is a head-mounted display (HMD) system.

In some implementations, the tokenizer and the trained LLM are configured to run locally on the system.

In some implementations, providing feedback to the user in accordance with injecting the one or more events into the application interface comprises: presenting, on a display of the system, an updated rendering of the application interface in response to controlling the one or more actionable UI elements.

In some implementations, providing the feedback to the user in accordance with injecting the one or more events into the application interface further comprises: playing sound on a speaker of the system, or delivering haptic feedback to the user using a haptic feedback device of the system.

In one embodiment, a method comprises: obtaining data associated with input by a user at an application interface indicating an intent to control the application interface; tokenizing, using a tokenizer, the data associated with the input by the user to create tokenized user input data; obtaining tokenized UI element data corresponding to a tokenized record of actionable UI elements associated with the application interface; generating, using a trained LLM model, based at least on the tokenized UI element data and the tokenized user input data, one or more events to inject into the application interface to control one or more of the actionable UI elements; injecting the one or more events into the application interface to control the one or more actionable UI elements in accordance with the input by the user; and providing feedback to the user in accordance with injecting the one or more events into the application interface.

In one embodiment, one or more non-transitory computer readable mediums store instructions that, when executed by one or more processors of a system, cause the system to perform operations comprising: obtaining audio data corresponding to a vocal command by a user indicating an intent to perform a task with an object present in a field of view of a camera of the system; capturing, using the camera, one or more images of the object; recognizing, based on the one or more images, using a trained image classification model, the object; tokenizing, using a tokenizer, the audio data to obtain tokenized audio data; obtaining tokenized object document data corresponding to a tokenized record of object document data obtained from one or more documents describing the object; generating, using a trained LLM, based at least on the tokenized object document data and the tokenized audio data, a workflow to perform to complete the task, the workflow comprising a series of steps; and displaying, via an application interface, a first graphical representation of the workflow and a second graphical representation of the object.

In some implementations, the operations further comprise: instantiating one or more actionable UI elements for manipulating the first graphical representation and the second graphical representation in the application interface.

In some implementations, the operations further comprise: obtaining multimodal user input data associated with multimodal input by the user at the application interface indicating an intent to control the one or more actionable UI elements; and processing the user input data to provide feedback to the user, the feedback comprising: presenting, on the display, an updated rendering of the application interface.

In some implementations, obtaining the multimodal user input data comprises processing a natural language voice command by the user.

In some implementations, obtaining the tokenized object document data comprises: extracting the object document data from the one or more documents describing the object; and tokenizing the extracted object document data to obtain the tokenized object document data. In some implementations, the tokenized object document data comprises spatial tokens relating one or more equipment components to one or more respective physical locations.

In one embodiment, a method comprises: obtaining, by one or more processors, multimodal user input data indicating an intent to control an application interface, the multimodal user input data comprising at least one of voice data captured by a microphone array, gesture data captured by an IMU or eye tracking data captured by an eye tracking camera; scraping the application interface to create a record of actionable UI elements associated with the application interface; tokenizing, using a natural language tokenizer, the multimodal user input data to create tokenized user input data, wherein tokenizing comprises converting the multimodal user input data into a structured token sequence compatible with LLM processing; tokenizing, using the natural language tokenizer, the record of actionable UI elements to create tokenized UI element data; generating, using a trained LLM executing locally on the one or more processors and based at least on the tokenized UI element data and the tokenized user input data, one or more interface control events configured to control one or more of the actionable UI elements; injecting the one or more interface control events into the application interface to control the one or more actionable UI elements in accordance with the multimodal user input data; and providing multimodal feedback to a user, the multimodal feedback comprising at least one of haptic feedback delivered through a haptic feedback device, visual feedback presented on a display, or audio feedback output through a speaker, in response to injecting the one or more interface control events.

In some implementations, scraping the application interface comprises one or more of the following operations: identifying windows within the application interface using accessibility service APIs of an operating system; identifying actionable UI elements within each window, the actionable UI elements comprising buttons, text fields, dropdown menus, and interactive controls; assigning unique identifiers to each actionable UI element using hashing algorithms; determining interaction capabilities for each actionable UI element including touch events, click events, keyboard input, and/or gesture commands; and/or storing spatial coordinate information for each actionable UI element relative to the application interface.

In some implementations, tokenizing the record comprises one or more of the following operations: encoding spatial relationships between UI elements; encoding functional metadata for each UI element; encoding hierarchical container relationships within the application interface; and/or creating cross-reference mappings between visual descriptions and functional capabilities;

In some implementations, generating the one or more interface control events comprises one or more of the following operations: analyzing the tokenized user input data to extract intent information and target UI elements; determining event types from a plurality of event categories including touch events, click events, swipe gestures, keyboard input, and system-level commands; and/or calculating precise coordinate locations for spatial targeting of the one or more interface control events; optimizing event timing sequences for multi-step interactions;

In some implementations, injecting the one or more interface control events in the application interface comprises one or more of the following operations: utilizing platform-specific accessibility APIs to inject events at an operating system level; implementing application-level event injection through native UI testing frameworks; performing hardware-level event simulation for precise timing control; and/or validating successful event injection through real-time interface state monitoring.

In some implementations, providing multimodal feedback comprises one or more of the following operations: presenting an updated rendering of the application interface on the display showing results of the interface control events; generating confirmation audio indicating successful completion of the requested action; and/or delivering tactile feedback corresponding to the type of interface interaction performed.

In one embodiment, a system comprises an IMU sensor; optionally, an eye tracking camera; a microphone array; one or more processors; and one or more non-transitory computer readable mediums storing instructions that, when executed by the one or more processors, cause the system to perform operations comprising: receiving input data from each of the IMU sensor, the optional eye tracking camera, and the microphone array; fusing the input data; processing, using an on-device artificial intelligence (AI) system comprising one or more trained models, the fused input data to generate gesture commands; executing the gesture commands to control a computing device; and in response to executing the gesture commands, providing multimodal feedback including a combination of haptic feedback, audio feedback, or visual feedback.

In some implementations, fusing the input data comprises: fusing the input data using an Adaptive Sensor Integration (ASI) algorithm employing an Extended Kalman Filter (EKF) that dynamically adjusts to changing sensor reliabilities and environmental conditions.

In some implementations, on-device AI system comprises: an energy-efficient Natural Language Understanding (NLU) engine; an adaptive gesture mapping neural network; and a reinforcement learning optimizer for context-aware interactions.

In some implementations, the NLU engine utilizes a compressed Transformer architecture.

In some implementations, the adaptive gesture mapping neural network employs meta-learning techniques for rapid adaptation to individual users.

In some implementations, the reinforcement learning optimizer uses a hierarchical Deep Q-Network (H-DQN) with a custom reward function that balances task completion, efficiency, user satisfaction, and error reduction.

In one embodiment, a method for customizable gesture mapping in a multimodal interface system comprises: providing a graphical user interface for defining custom gestures; receiving, at the graphical user interface, user input defining a custom gesture definition; compiling, using a dynamic gesture compiler, the custom gesture definition that was defined; after compiling, storing the custom gesture definition in a gesture database; recognizing the custom gesture definition during operation of the multimodal interface system; and in response to recognizing the custom gesture definition, executing, by the multimodal interface system, actions associated with the custom gesture definition.

In some implementations, the method further comprises: detecting user interface elements on a display using a coordinate detection system; mapping voice commands to screen coordinates using a voice-to-coordinate mapping model; and incorporating the mapped coordinates into the custom gesture definition.

In one embodiment, a privacy-preserving authentication system for a multimodal interface comprises: zero-knowledge proof authenticator for user authentication; a homomorphic encryption module for performing computations on encrypted user data; a differential privacy mechanism for adding calibrated noise to data used for model improvement; and a secure enclave for storing encryption keys and processing sensitive data. In some implementations, all data processing occurs on-device, eliminating the need for cloud connectivity for core functions.

In one embodiment, a method for dynamic content interaction in a multimodal interface system, comprises: analyzing, using a custom HTML5 parser, metadata of web content; performing optical character recognition (OCR) on screen content; injecting JavaScript code for interaction with dynamic elements; generating, based on the analyzed metadata and user input, gesture commands; and enabling voice control of existing applications without extensive redevelopment.

In one embodiment, a system for adaptive learning in a multimodal interface, comprises: a) a federated learning module for aggregating model updates across devices; b) a continual learning mechanism using Elastic Weight Consolidation; c) a performance monitoring system for tracking gesture recognition accuracy and user correction rates; and d) a context-aware model that adapts to user behavior patterns and environmental conditions.

In one embodiment, a method for energy-efficient operation of a multimodal interface system, comprises: a) dynamically adjusting sensor polling rates based on user activity and device state; b) selectively offloading processing tasks to low-power co-processors; c) employing predictive activation of system components based on usage patterns; d) adapting the complexity of AI models based on available power resources; and e) implementing context-aware processor frequency scaling.

In one embodiment, a cross-platform compatibility system for a multimodal interface, comprising: a) a hardware abstraction layer for adapting to diverse sensor configurations; b) a scalable AI processing pipeline that adjusts model complexity based on available computational resources; c) a platform-agnostic gesture execution module; and d) a unified interaction framework for consistent functionality across different operating systems and devices.

In one embodiment, a method for context-aware gesture generation in a multimodal interface system, comprises: a) analyzing current application state and screen content; b) processing user input using an on-device NLU engine; c) generating a context-aware gesture sequence using a reinforcement learning model; d) executing the generated gesture sequence; and e) adapting the gesture generation based on user feedback and interaction patterns.

In one embodiment, a multimodal feedback system for a user interface, comprises: a) a haptic feedback generator for producing tactile responses; b) an audio feedback module for generating spatial audio cues; c) a visual feedback component for displaying non-intrusive visual indicators; and d) a central feedback coordinator for synchronizing haptic, audio, and visual feedback, wherein the system adapts feedback based on user preferences, device capabilities, and environmental conditions.

In one embodiment, a method for enhancing accessibility in a multimodal interface system, comprises: a) providing multiple interaction modalities including voice, head movement, and eye tracking; b) offering customizable feedback options including haptic, audio, and visual cues; c) implementing adaptive UI elements that adjust based on user abilities and preferences; and d) enabling creation of personalized interaction profiles for users with diverse physical abilities.

In one embodiment, a system for seamless AR/VR interaction, comprises: a) a gesture recognition module for interpreting 3D spatial movements; b) a gaze-based object interaction module for selecting and manipulating virtual objects; c) a voice command processor for navigating virtual environments; and d) a context-aware interaction model that adapts to different virtual and augmented reality scenarios.

In one embodiment, a method for intelligent error handling in a multimodal interface system comprises: a) implementing probabilistic approaches for disambiguating user inputs; b) providing graceful degradation of functionality in suboptimal conditions; c) offering clear, actionable feedback for error recovery; and d) adapting system behavior based on historical error patterns and user responses.

In one embodiment, a system for extensible and future-proof multimodal interactions, comprises: a) a modular architecture allowing integration of new sensing technologies; b) an upgradable AI model framework supporting easy model swapping and enhancement; c) an open API for third-party developers to extend system capabilities; and d) a forward-compatible gesture language supporting emerging interaction paradigms.

In one embodiment, a method for providing multimodal feedback in a user interface system, comprises: a) generating haptic feedback using a linear resonant actuator based on user interactions; b) producing spatial audio cues using a 3D audio engine to provide directional and contextual audio feedback; c) displaying visual indicators adapted to the current device's display capabilities; and d) synchronizing the haptic, audio, and visual feedback using central feedback coordinator to ensure a coherent user experience. In some implementations, the method further comprises: a) customizing feedback intensity and type based on user preferences and environmental conditions; b) adapting the feedback modalities in real-time based on the current application context and user interaction patterns; and c) providing graceful degradation of feedback in cases of hardware limitations or user-defined restrictions.

In one embodiment, a method for on-device processing in a multimodal interface system comprises: a) performing all AI model inferencing and data processing locally on the user's device; b) encrypting all user data and AI models using AES-256 encryption in Galois/Counter Mode (GCM) mode; c) implementing federated learning techniques for model updates without sharing raw user data; and d) providing full offline functionality for all core system features.

In one embodiment, a system for dynamic gesture creation and execution, comprises: a) a gesture definition interface for users to create custom gestures; b) a gesture compiler that converts user-defined gestures into executable code; c) a gesture recognition module that identifies custom gestures during runtime; and d) an execution engine that performs actions associated with recognized gestures. In some implementations, the system further comprises: a machine learning module that continuously improves gesture recognition accuracy based on user feedback and usage patterns.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 8 depicts example voice commands that can interpreted into an action at an application by the universal application control system of FIG. 7, in accordance with some implementations of the disclosure.

The figures are not exhaustive and do not limit the disclosure to the precise form disclosed.

DETAILED DESCRIPTION

The technology described herein relates to advanced multimodal human-computer interfaces, specifically systems and methods that integrate natural language processing, motion-based gesture recognition, computer vision, a tokenizer, and a LLM to enable hands-free control of computing display devices such as HMD, a smartphone, a tablet, a laptop, or a desktop display device. By implementing the technology described herein, intelligent workflows can be created from visual content analysis, and universal application control can be provided without requiring predefined commands or specialized programming.

Various advantages can be realized by implementing the technology described herein, improving upon some of the limitations of current voice assistants used by big technology companies and/or the numbered-command systems used by industrial smart glass manufacturers. First, the technology described herein can provide on-device, real-time multimodal processing of user input for hands-free, natural user interaction. In addition, the technology described herein can be configured to automatically understand any application interface and provide universal application control without requiring specialized programming or predefined knowledge that requires users to memorize specific application commands. Further, the technology described herein can analyze visual content (e.g., equipment, manuals, interfaces) to automatically generate procedural workflows with appropriate step sequencing and user guidance. Further still, the technology described herein can provide on-device LLM inference that leverages a tokenizer to run on resource-constrained mobile devices to enable reduced latency, improved privacy, and offline functionality. These and other advantages that can be realized by the technology described herein are further described below.

Figure 1:
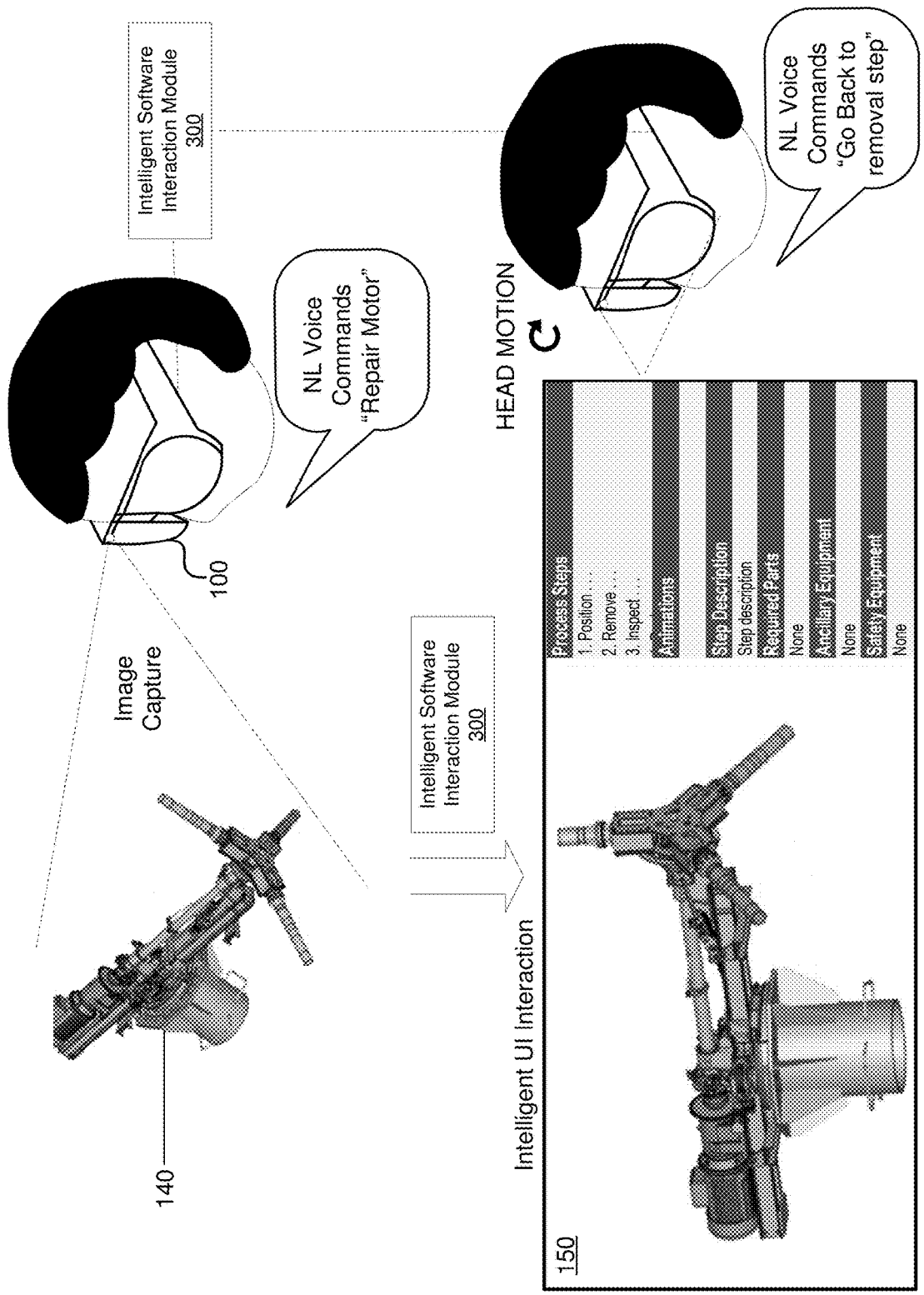
FIG. 1 illustrates an example environment in which the technology described herein can be implemented to provide intelligent device control, in accordance with some implementations of the disclosure.

FIG. 1 illustrates an example environment in which the technology described herein can be implemented to provide intelligent device control. In this example environment, the technology is implemented using a wearable HMD 100 running an intelligent interaction software 300 to provide intelligent control of HMD 100. In other implementations, the technology can be implemented using a handheld mobile device such as a smartphone or tablet, or even a desktop device. In yet other implementations, the HMD 100 can be tethered to another device (e.g., a handheld mobile device or desktop device), in which case at least some functionalities of intelligent interaction software 300 can be executed by the device that HMD 100 is tethered to.

The example environment of FIG. 1 depicts an embodiment in which an intelligent workflow is created from visual content analysis of equipment 140, which in this example is a motor. In particular, a user wearing HMD 100 that has equipment 140 in their line of sight issues a natural voice command to repair equipment 140. The voice command is recorded using a microphone of HMD 100, and one or more images of equipment 140 are captured using a camera of HMD 100. This multimodal data input can be provided to intelligent interaction software 300 that uses one or more trained models to: i) recognize, based on the capture image(s), equipment 140; ii) retrieve, from a knowledge base, data (e.g., manuals) relating to equipment 140; and iii) apply, based on the retrieved data, NLP to understand the context of the user's command to repair the equipment 140 and generate an actionable workflow that is presented to the user on a display of HMD 100 via a UI 150 of intelligent interaction software 300. In some implementations, further described below, the intelligent interaction software 300 can use an on-device LLM in conjunction with a tokenizer to retrieve content that relates to the recognized equipment 140 (e.g., a stored repair manual) and convert the retrieved content to actionable steps that are presented to the user.

As further depicted in the example of FIG. 1, after the actionable steps are presented to the user via UI 150, intelligent interaction software 300 can be configured to process multimodal user input (e.g., data corresponding to head motion and natural language voice commands) to enable natural user interaction with the actionable workflow, which can be hands free.

Before further describing the technology of the present disclosure, it is instructive to consider the general operation of intelligent interaction software 300, and its associated technical advantages, in accordance with some implementations of the disclosure. The intelligent interaction software 300 can function as a comprehensive overlay system that transforms any existing application into a fully voice and gesture-controlled interface without requiring modifications to the underlying software. Unlike some current voice interaction systems that may rely on static, rule-based programming or proprietary development frameworks, the intelligent interaction software 300 can operate as an intelligent intermediary layer that can understand and control any application regardless of how it was originally programmed.

As an overlay system, the intelligent interaction software 300 can operate independently of the underlying applications while providing integration that makes any software fully accessible through natural language commands and gesture inputs. This approach can enable immediate deployment across existing software ecosystems without requiring developer cooperation, application updates, or specialized programming, making it practical for enterprise environments where modifying individual applications would be impractical or impossible.

For example, as further described herein, the intelligent interaction software 300 can process multimodal user input corresponding to voice commands, eye tracking, head movements, and/or physical gestures, converting them into actionable interface controls. The intelligent interaction software 300 can enable users to perform any standard application function through voice commands while extending capabilities beyond what applications typically provide by leveraging operating system functions such as zoom, rotation, and window management that may not have corresponding interface buttons in the original application.

By contrast, many current voice control systems suffer from significant compatibility restrictions that limit their practical utility. Such systems can require that applications be specifically programmed with adequate metadata, comply with accessibility best practices, or be developed using manufacturer-specific software development kits (SDKs) to support voice interactions. For example, cross-platform applications typically cannot utilize specialized features like REALWEAR's WEARHF recognition system for wearable smart glasses or other manufacturer-specific voice technologies, creating fragmented user experiences and limiting deployment possibilities across diverse hardware environments. As further described herein, the intelligent interaction software 300 can address these limitations through a modular architecture that combines multiple specialized processing systems.

Figure 2:
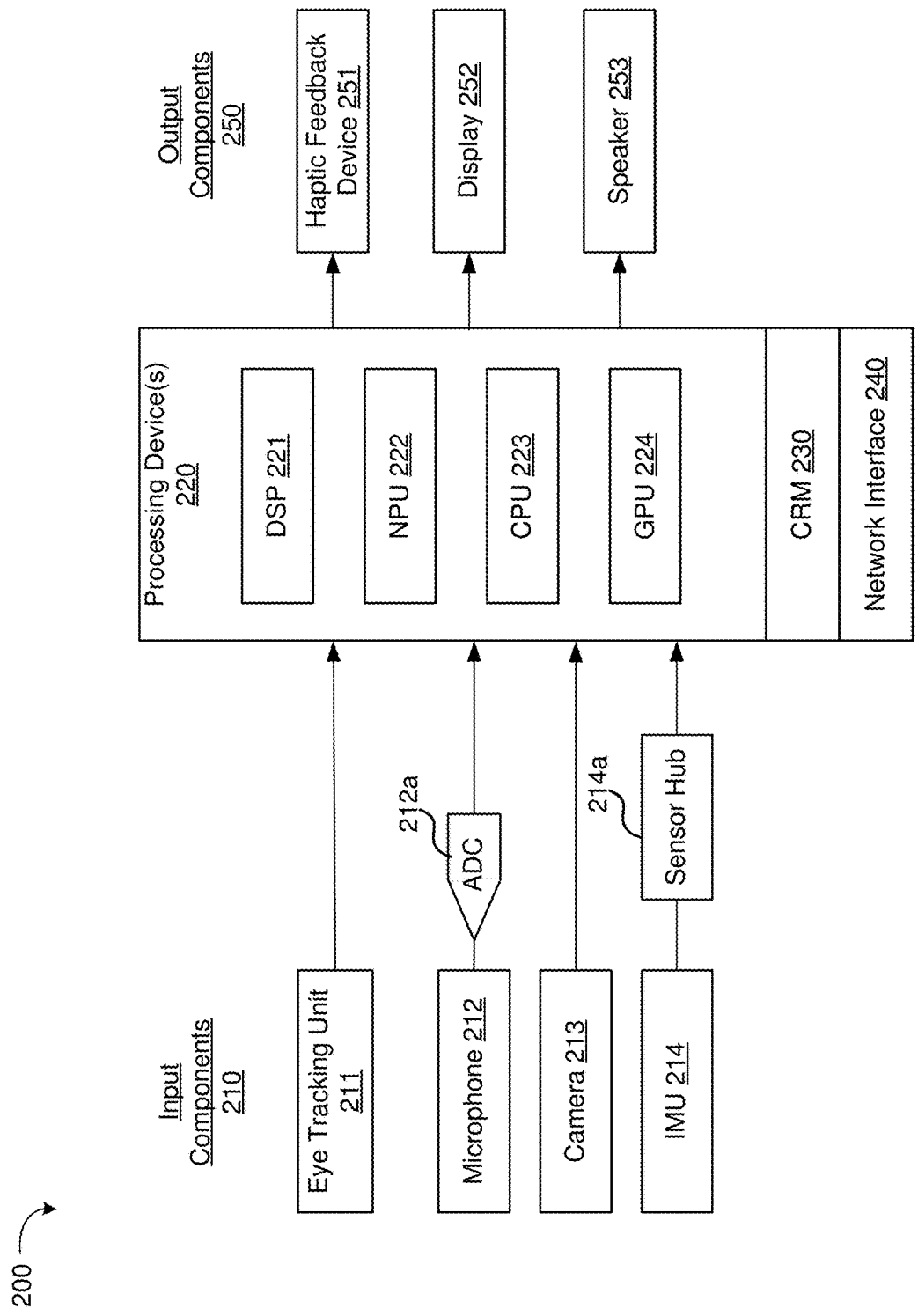
FIG. 2 is a block diagram illustrating some example hardware components that a computing device can utilize to provide intelligent device control, in accordance with some implementations of the disclosure.

FIG. 2 is a block diagram illustrating some example hardware components that a computing device 200 can utilize to provide intelligent device control, in accordance with some implementations of the disclosure. HMD 100 or some other mobile display device such as a handheld mobile display device, or a desktop display device, can correspond to the computing display device 200 depicted in FIG. 2. In some implementations, these hardware components may be distributed across multiple devices (e.g., a HMD tethered to another device by cable or wirelessly). It should be appreciated that implementations described herein are not limited to this particular hardware architecture, and that depending on the computing display device, certain hardware components may be added or not implemented as depicted in FIG. 2.

The computing device includes multiple hardware input components 210 for receiving a multimodal data corresponding to user input. These input components 210 can include an eye tracking unit 211, a microphone 212, a camera 213, and an IMU 214. In some implementations, the hardware input components 210 can also include a GPS and/or LIDAR unit.

The eye tracking unit 211 can be configured to track the position and focus of the user's eyes using one or more cameras. For example, the eye tracking unit 211 can include one or more infrared (IR) illuminators placed in a HMD to illuminate the user's eyes without causing discomfort, and one or more corresponding IR multiple cameras can capture images. As another example, in handheld mobile displays the eye tracking unit 211 could utilize a front-facing, high resolution camera. In some implementations, a combination of image processing machine learning techniques can be employed to process the captured eye tracking image data to estimate the position and focus of the user's eyes. For example, a neural network can be used for appearance-based gaze estimation.

Microphone 212 can receive vocal input (e.g., vocal commands for interacting with intelligent interaction software 300) from a user that is digitized via analog to digital converter (ADC) 212*a* and made available to one or more processing device(s) 220 to implement the technology described herein. Microphone 212 can be any transducer that converts sound into an electric signal that is later converted to digital form. For example, microphone 212 can be a digital microphone including an amplifier and ADC 212a. In some implementations, microphone 212 can be implemented as a microphone array. For example, microphone 212 can include multiple MEMS microphones arranged in a pattern on the frame of a HMD.

Camera 213 can be configured to capture the user's field of view (FOV) or environment in real-time. For example, the camera 213 can capture images of equipment, manuals, or other visual content in the user's FOV or environment that is used to generate an interactive UI. The camera 213 can be positioned, for example, on the side, both sides, or center of the user's head on a frame of a HMD. Alternatively, the camera 213 can be incorporated into a handheld mobile device. The camera can may be implemented as a video camera, light-field camera, low-light camera, thermal camera, IR camera, spectrographic camera, or some combination thereof.

IMU 214 can measure and report a specific orientation and movement of the computing device using some combination of accelerometers, gyroscopes, and/or magnetometers. For example, in the case of a HMD worn by a user, it can deliver a data stream relating to the user's head position and attentional focus. In some implementations, the IMU 214 can be implemented as a 3-DOF (degrees of freedom) or 6-DOF implemented into the frame or body of the HMD. One benefit of the 3-DOF implementation is that it minimizes the hardware requirements and cost of the HMD. In other implementations, the IMU 214 can be implemented as a 9-axis IMU comprising a 3-axis accelerometer, a 3-axis gyroscope, and a 3-axis magnetometer.

A dedicated sensor hub 214a can be included to fuse and process the data of the different sensor components of IMU 214, prior to the data stream being made available to one or more processing device(s) 220. In some implementations, the system can use a quaternion-based orientation estimation algorithm to fuse the data from the sensors of the IMU 214.

The computing device can also include one or more processing device(s) 220 for running intelligent interaction software 300. For example, the one or more processing device(s) 220 can process the multimodal data input generated from the user, and/or implement the intelligent device control methods described herein. The processing device(s) can include a digital signal processor (DSP) 221, a neural processing unit (NPU) 222, a graphics processing unit (GPU) 223, and/or a central processing unit (CPU) 224. The DSP 221 can be configured to process input image and/or audio data. The NPU 222 can be configured to accelerate the on-device AI and machine learning tasks described herein. The GPU 223 can be configured to process input image data and/or perform graphics processing/rendering for display. The CPU 224 can be configured to execute instructions that coordinate the general operation of intelligent interaction software 300. Each of the aforementioned processing device(s) 220 can execute instructions for performing the aforementioned operations and intelligent device control techniques described in the present disclosure.

Computer readable storage medium (CRM) 230 can comprise volatile memory (e.g. RAM), non-volatile memory (e.g. flash storage), or some combination thereof. In implementations, CRM 230 can store data generated using input components 210. In some implementations, CRM 230 can store instructions executed by one or more of processing device(s) 220. For example CRM 230 can store data and instructions needed to run the software routines of an intelligent interaction software 300.

In some implementations, CRM 230 can store data needed to run trained models locally. This data can include model weights or parameters, quantization data, tokenizer files, inference engine/runtime libraries, and/or other model configuration data or metadata. For example, in particular implementations, the on-device AI-system can include a compressed LLM with tens, hundreds of millions, or billions of parameters, a neural network model trained to perform gesture recognition/mapping, and/or a model trained to perform context-aware gesture generation.

Network interface 240 can connect the computing display device to the Internet using, for example, a WIFI network, a cellular network, a satellite network, or some combination thereof. In some implementations, it can be used to provide communication between the device and third party domains that store media content (e.g., equipment manuals) needed to support certain routines of intelligent interaction software 300. The communication could also support cloud-based services associated with the intelligent interaction software 300, such as to assist with artificial intelligence procedures. It should be appreciated, however, that some or all of the artificial intelligence capabilities described herein, including natural language processing and conversion of voice or text input into device-interacting gestures can preferably be implemented offline to improve the security and response time of intelligent interaction software 300.

The computing device 200 further includes multiple hardware output components 250 for providing feedback, including multimodal feedback, to the user of computing device 200. These output components 250 can include haptic feedback device 251, display 252, and speaker 253. During user interaction facilitated using intelligent interaction software 300, haptic feedback device 251 can be configured to deliver tactile feedback (e.g., via device vibrations), display 252 can be configured to present a visual display to the user, and speaker 253 can be configured to deliver auditory feedback to the user.

In HMD implementations, the display 252 can be implemented as an augmented reality (AR) or mixed Reality (MR) display such as a video see-through or non-see through display or optical see-through display. Alternatively, the display 252 can be implemented as a VR display such as a video display that is not see-through. In HMD implementations, the display 252 can be implemented in a variety of form factors such as, for example, glasses, a headset, or a visor. In handheld mobile device implementations, the display 252 can be a touchscreen of the handheld mobile device. In such implementations, the display 252 can also function as an input component 210 that, in response to user input corresponding to touch gestures, generates data that is processed with the other input data using multimodal data input fusion. In such implementations, the user input can be detected via one or more touch sensors of the display 252.

Figure 3:
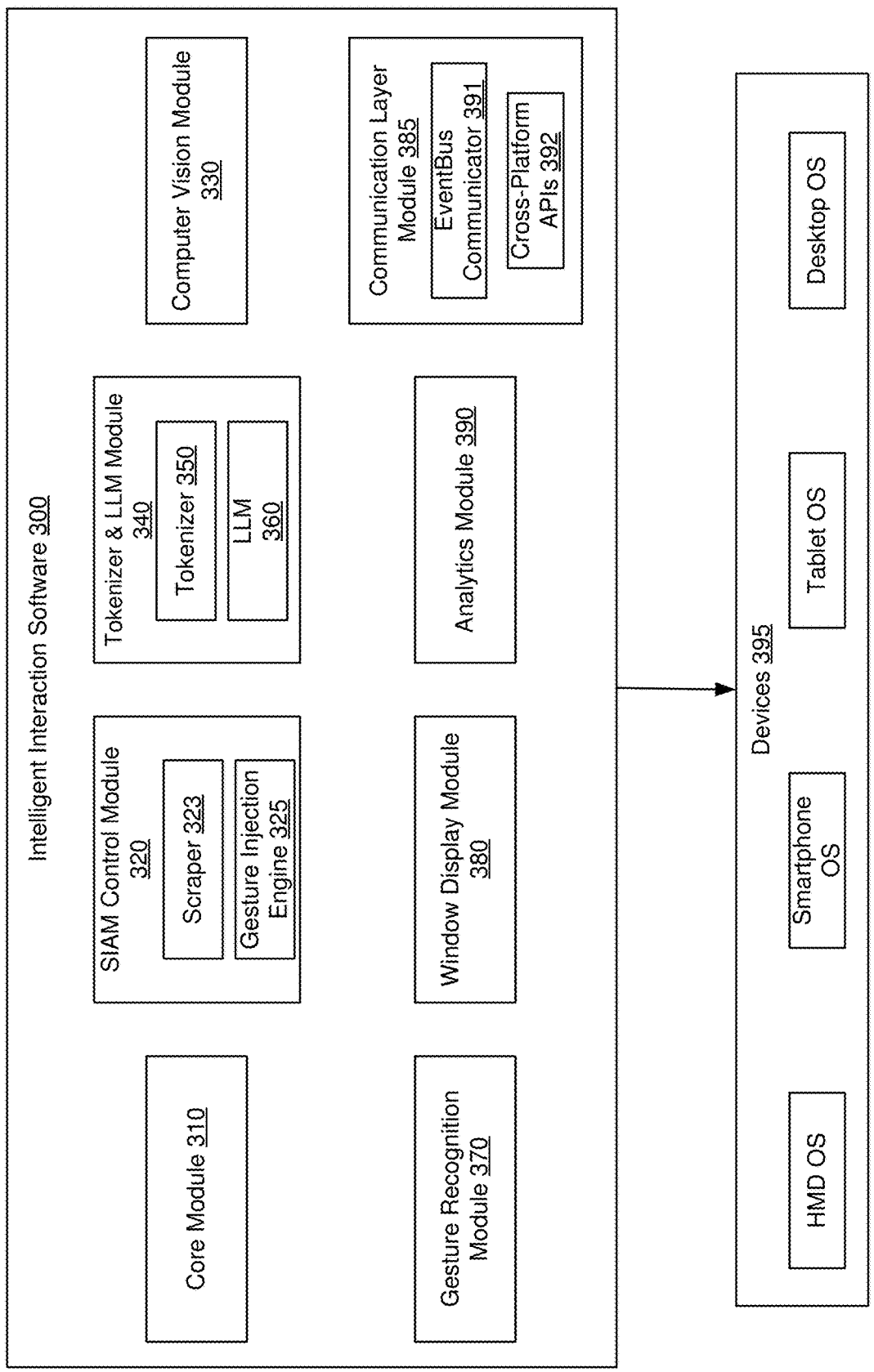
FIG. 3 is a block diagram illustrating an example modular architecture of components of intelligent interaction software that can be deployed in target devices spanning multiple different platforms, in accordance with some implementations of the disclosure.

FIG. 3 is a block diagram illustrating an example modular architecture of components of intelligent interaction software 300 that can be deployed in target devices 395 spanning multiple different platforms, in accordance with some implementations of the disclosure. The intelligent interaction software 300 can include multiple software modules, including modules that can coordinate interaction between the different software modules and enable cross-platform support on target devices 395 spanning different operating systems. In particular, the software modules of intelligent interaction software 300 can include a core module 310, a SIAM control module 320, a computer vision module 330, a tokenizer and LLM module 340, a gesture recognition module 370, a window display module 380, a communication layer module 385, and/or an analytics module 390.

The core module 310 can be configured to provide central orchestration of intelligent interaction software 300, managing and coordinating interactions among the other modules of software module layer 305, including invoking other modules to initiate actions or manage dependencies, and managing data for use by other modules. In some implementations, the core module 310 can be configured to continuously monitor device usage (e.g., CPU, memory, battery) and intelligently allocate processing tasks among the modules, ensuring optimal performance across different hardware platforms from resource-constrained smart glasses to high-performance mobile devices.

In some implementations, the core module 310 can maintain a unified contextual state that bridges voice commands, visual scene understanding, and user behavioral patterns, enabling seamless transitions between different interaction modalities without losing operational context. In some implementations, the core module 310 can implement real-time learning algorithms that observe user interaction patterns and automatically optimize module coordination strategies, improving response accuracy and reducing processing latency through personalized adaptation.

The scraping, injection, and manipulation (SIAM) control module 320 can be configured to work in conjunction with tokenizer and LLM module 340 to provide universal application control and intelligent workflow management via natural gesture commands. To provide universal application control, the SIAM control module 320 can includer a scraper 323 configured to scrape any application interface to identify all windows and actionable UI elements of the application interface, including actional UI elements that do not have associated application metadata, but can be triggered by having the OS initiate an event that is injected into the application (e.g., via system accessibility services). Particular techniques for scraping an application interface are further described below.

The SIAM control module 320 can be further configured to provide contextual injection of commands that are interpretable by an application interface or the OS on which the application interface runs. To this end, tokenizer and LLM module 340 can contextually determine, based on multi-modal input or single modal input corresponding to the user's interaction with the application interface, what command(s) to inject into the application interface, and provide this/these command(s) to SIAM control module 320 for injection. Particular implementations of a SIAM control module 320 for intelligent and universal application control are further described below. In some implementations, the SIAM control module 320 can also be configured to dynamically generate interactive UI elements for each application it encounters. These additional, generated UI elements can be native components of the intelligent interaction software 300.

To enable intelligent workflow management, the SIAM control module 320 can be configured to implement a comprehensive internal workflow interface with advanced multimodal gesture processing and universal touch conversion capabilities. To this end, in some implementations, the SIAM control module 320 can dynamically generate interaction UI elements for each workflow step that is created, creating virtual buttons, injectable gestures, progress indicators, and navigation controls that respond to voice commands, head movements, and/or physical gestures. These generated UI elements can be native components of the intelligent interaction software 300, not injected into external applications.

In implementations, the SIAM control module 320 includes a gesture injection engine 325 configured to convert any input modality into standardized interaction events, enabling consistent application and workflow control whether the user speaks a command, nods their head, or makes a hand gesture.

In some implementations, the gesture injection engine 325 can implement a motion-touch system configured to convert physical movements and gestures detected by IMU sensors, cameras, and other input devices into equivalent touch events. Users can perform hand gestures, head movements, or body motions that the system translates into precise touch interactions. For example, a user wearing smart glasses can make a pinching motion with their fingers (detected by hand tracking cameras), and the motion-touch system converts this into a pinch-to-zoom touch event on the screen. Similarly, head tilts can be converted into swipe gestures, allowing users to navigate through content by simply moving their head in the desired direction.

The motion-touch system can provide comprehensive physical gesture equivalents for complex multi-touch operations. Head tilts can become directional swipes, hand pinching motions can become zoom controls, pointing gestures can become tap commands, and rotating hand movements can become screen rotation controls. The system can use spatial tracking algorithms to determine appropriate touch coordinates based on the user's physical gesture direction, amplitude, and context. Eye gaze integration can provide precision targeting, allowing users to look at a screen element and then perform a head nod or hand gesture to interact with that specific location.

In some implementations, the SIAM control module 320 is configured to continuously receive real-time data from an IMU 214 and process head motion patterns through specialized gesture recognition algorithms designed specifically for environments where voice commands are impractical or impossible. For example, in manufacturing facilities with high ambient noise levels, medical environments requiring silence, or professional settings where speaking would be disruptive, users can control windows, applications, and screen elements entirely through deliberate head movements. The gesture injection engine 325 can be configured to convert specific head motion patterns into precise window manipulation commands including window repositioning, resizing, switching between applications, and controlling UI elements without requiring any vocalization.

IMU processing algorithms can recognize distinct head motion patterns for comprehensive window control operations. For example, a slow head tilt to the right followed by a deliberate nod can move an active window in the specified direction. As another example, quick head shakes can trigger window switching between open applications, while sustained head tilts combined with forward head movements can resize windows dynamically. The system can distinguish between natural head movements during normal activity and intentional gesture commands through motion signature analysis that evaluates gesture duration, amplitude, directional consistency, and pattern repetition. Users can minimize windows through downward head tilts, maximize them through upward head movements, and close applications through specific circular head motion patterns.

Beyond window management, the head motion processing techniques implemented via SIAM control module 320 can enable detailed control of individual screen elements in noise-sensitive or quiet environments. Users can navigate between buttons, menu items, and interface components through subtle head movements that move a cursor or selection indicator across the screen. Small leftward head tilts can move selection to the left, rightward tilts move selection right, and forward head movements can activate or select the currently highlighted element. This approach can provide comprehensive application control in environments where voice commands would be inappropriate, disruptive, or impossible to recognize due to ambient noise levels.

The IMU-based head motion system can automatically adapt its sensitivity and gesture recognition thresholds based on environmental conditions detected through ambient noise monitoring and usage context analysis. In loud industrial environments, the system can increase gesture detection sensitivity to ensure reliable operation despite potential vibration interference. In quiet environments like libraries, hospitals, or meeting rooms, the system can enable more subtle head movements to prevent drawing attention while maintaining precise control capabilities. The system can learn individual user head movement patterns and adapt gesture recognition parameters to accommodate natural variations in head motion range, speed, and coordination abilities.

In addition, gesture injection engine 325 can implement a voice-touch system configured to convert spoken commands into equivalent touch gestures for hands-free control of any touch-based application. For example, users can perform standard mobile device interactions through voice commands including "tap," "swipe left," "pinch to zoom," "drag to," "double tap," "long press," "rotate right," and "scroll down." The system can map these voice commands to precise coordinate-based touch events that applications interpret as genuine finger contact. For example, when a user says "swipe left" while viewing a photo gallery, the system can calculate appropriate start and end coordinates and inject a swipe gesture event that produces the same response as a physical finger swipe. Alternately, the system can combine gestures previously not contemplated by the software author with those available through the OS such as zoom. For example, consider an application that allows for rotation left, right, etc. via controls provided by the third party software author, yet the OS has the ability to zoom the element. In such cases, the user can ask for a "pinch open" or "Zoom-In" and the selected element will zoom in. This can be added to the existing command of turn left or rotate.

In implementations, the SIAM control module 320 can implement a gesture processing pipeline in conjunction with gesture recognition module 370 that handles both voice and motion inputs through a unified architecture to provide context-aware gesture control. The system can receive raw sensor data from IMU sensors, cameras, eye tracking units, and microphones, and then apply contextual gesture recognition algorithms that understand the current application state to interpret ambiguous motions correctly. Recognized patterns can be converted into standardized gesture tokens that can represent either workflow control commands or synthesized touch events. The system can generate authentic touch data including contact pressure simulation, multi-touch point coordination, gesture timing patterns, and velocity calculations that match natural human touch behavior.

The voice-touch and motion-touch systems can maintain gesture state machines that track ongoing touch sequences and enable complex combination operations. Users can perform multistep gestures through continuous voice commands or sustained physical motions. For example, a user can begin a pinch gesture through voice command ("start pinch"), adjust the zoom level through head movements or additional voice commands ("zoom in more"), and complete the gesture through another voice command ("stop pinch") or a specific head motion. The system can provide gesture interruption and cancellation capabilities, allowing users to abort operations midway through voice commands or specific motion patterns.

The voice-touch and motion-touch systems can create seamless integration with any touch-based application by generating authentic touch events that applications cannot distinguish from physical finger contact. This approach can enable hands-free control of the entire mobile and tablet application ecosystem without requiring any application modifications, specialized programming, or developer APIs. Legacy applications, games, productivity software, and web browsers can become immediately controllable through voice commands and physical gestures. The system maintains full compatibility with complex multi-touch applications, supporting everything from simple navigation to sophisticated creative software that relies on precise gesture input.

The combined voice-touch and motion-touch systems can use spatial awareness algorithms to determine precise touch coordinates based on multiple contextual factors. Eye gaze tracking provides targeting information, screen content analysis identifies interactive elements, and voice targeting enables users to specify particular interface components through spoken descriptions. The system adapts gesture interpretation based on the current application context, screen content, and learned user behavioral patterns, ensuring that the same physical motion or voice command produces appropriate results regardless of the application being controlled.

In intelligent workflow management implementations, the SIAM control module 320 can operate in a distinct internal workflow management (IWM) mode. In IWM mode, rather than injecting commands into external third-party applications, the SIAM control module 320 can implement an internal virtual event bus that receives and processes workflow control commands. The gesture injection engine 325 can convert multimodal inputs into standardized workflow tokens that are routed through the virtual event bus to dynamically generated UI components native to the intelligent interaction software 300.

The scraping functionality in IWM mode can serve to register and catalog self-generated UI elements within an internal element registry, enabling consistent voice and gesture control of workflow components through the same natural language interface used for external application control. This dual-mode architecture allows the SIAM control module 320 to provide unified interaction paradigms across both external application control and internal workflow management without requiring external injection targets.

The tokenizer and LLM module 340 includes a tokenizer 350 and LLM 360. In the universal application control context, the tokenizer 350 can be configured to tokenize components of each application that intelligent interaction software 300 provides control of. For example, the application window and actionable UI element data scraped using SIAM control module 320 can be tokenized. In the intelligent workflow generation context, the tokenizer 350 can be configured to tokenize a knowledge base associated with equipment for which intelligent workflows are created. This knowledge base can include operation manuals, repair manuals, specification data, and the like.

The tokenizer 350 and LLM 360 work together to create structured, queryable representations of complex multimodal data, including advanced spatial information processing and gesture command mapping, enabling consistent AI responses across different contexts and content manipulation scenarios. For example, in some implementations, the tokenizer 350 can implement spatial tokenization algorithms that convert three-dimensional coordinate information, object orientations, scale factors, and/or spatial relationships into structured tokens that the LLM 360 can process consistently. By way of particular example, when users interact with 3D drawings, CAD models, or immersive content, the system can tokenize spatial elements as:
[SPATIAL:object_id:pump_housing:position:x:45.2:y:12.8:z: 67.3:rotation:pitch:15:yaw:90:roll:0]
[GEOMETRY:component:bearing_assembly:scale:1.5: visible_faces:front, top:occlusion:partial]
[RELATIONSHIP:spatial_connection:shaft_to_housing:distance: 12.4 mm:alignment:coaxial]

As another particular example, to enable document manipulation, video control, and/or media interaction, the tokenizer 350 can create spatial tokens that represent content structure, viewing parameters, and manipulation possibilities:
[DOCUMENT:page:5:viewport:x:0:y:150:zoom:125%:rotation: 0:selection:paragraph:3]
[VIDEO:timestamp:02:35:resolution:1920×1080: playback_rate:1.0:spatial_crop:x:100:y:50:w:800:h:600]
[DRAWING:layer:mechanical_components:visible:true: lock_status:false:active_tool:select]

The tokenized data can be maintained by tokenizer 350 in a database that can be referenced by LLM 360 during universal application control and/or intelligent workflow generation. In the application control scenario, based on the tokenized data corresponding to an application interface, and processed multimodal user input, the LLM 360 can generate a set of one or more commands for the SIAM control module 320 to inject into the application interface to naturally control the application interface in response to user input. In the intelligent workflow generation scenario, based on the tokenized data corresponding to equipment identified using computer vision module 330, and voice command user input indicating an intent with respect to the equipment, the LLM 360 can generate a set of instructions for the user to operate on the equipment.

By virtue of combining a tokenizer 350 and LLM 360 as described herein, the computational demand of LLM 360 can be reduced and on-device real-time multimodal processing of user input can be realized.

The computer vision module 330 can be configured to apply computer vision techniques to recognize visual content in images captured by camera 213 of the user's environment. For example, computer vision module 330 can be configured to recognize equipment in images captured by camera 213. To this end, the computer vision module 330 can utilize a zero-shot image classification model such as the Contrastive Language-Image Pretraining (CLIP) model to classify the visual content. The computer vision module 330 can operate with minimal computational overhead while converting visual information into actionable data through the tokenizer and LLM module 340. This combination can solve a critical consistency problem in some current AI systems where asking the same question under identical circumstances at different times often produces different responses. This integrated modular approach can ensure consistent, reliable results that are essential for field service repairs, medical applications, and other scenarios where predictable system behavior is crucial for safety and effectiveness.

The gesture recognition module 370 can be configured to recognize voice commands, IMU-based head tracking, and/or eye-tracking as individual gestures or combined gestures. In cases where multiple gestures is received, the gesture recognition module is configured to employ multimodal fusion. In some implementations, the gesture recognition module 370 can operate as a specialized pattern recognition engine that processes raw sensor data from IMU sensors, cameras, and other input devices to identify and classify discrete gesture patterns. Module 370 can maintain a comprehensive gesture template library and apply machine learning algorithms to recognize head movements, hand gestures, and eye tracking patterns with high accuracy and low latency.

The window display module 380 can be configured to provide multi-window management capabilities similar to an airplane cockpit interface. This can enable users to view and interact with multiple sources of information simultaneously in organized, manageable windows rather than being limited to the single-window interfaces typically found on mobile devices. In some implementations, users can control window positioning, sizing, and content through voice commands and gesture inputs while maintaining contextual awareness across multiple active workflows.

The analytics module 390 can be configured to continuously monitor system response times, gesture recognition accuracy rates, and user satisfaction indicators, automatically adjusting module parameters to optimize performance for individual users and specific use cases. In some implementations, the analytics module 390 can track user interaction preferences, frequently accessed applications, common workflow sequences, and environmental context patterns to enable predictive loading of relevant modules and proactive system optimization. In some implementations, the analytics module 390 can identify recurring interaction failures, voice recognition errors, and gesture misinterpretation patterns, providing data for adaptive learning algorithms to improve system accuracy and reduce user frustration through intelligent error prevention.

The communication layer module 385 can include an EventBus Communicator 391 and cross-platform application programming interfaces (APIs) 392. The EventBus Communicator 391 can be configured to provide real-time event coordination between the software modules of intelligent interaction software 300. The cross-platform APIs 392 can enable cross-platform compatibility of intelligent interaction software 300 with minimal UI adaptation such that it can run on a multitude of different devices 395, including HMDs such as smart glasses, smartphones, tablets, and desktop systems. For example, the intelligent interaction software 300 can be configured to run on a mobile OS such as ANDROID or IOS, a HMD OS, a desktop OS such as WINDOWS, MACOS, or LINUX, or a tablet OS such as a IPADOS or ANDROID.

Communication layer module 385 can also include other components not depicted in FIG. 3, including a software module manager to provide dynamic loading/unloading of software modules based on device resources and user needs, and a database that employs local storage and intelligent caching and synchronization.

Figure 4:
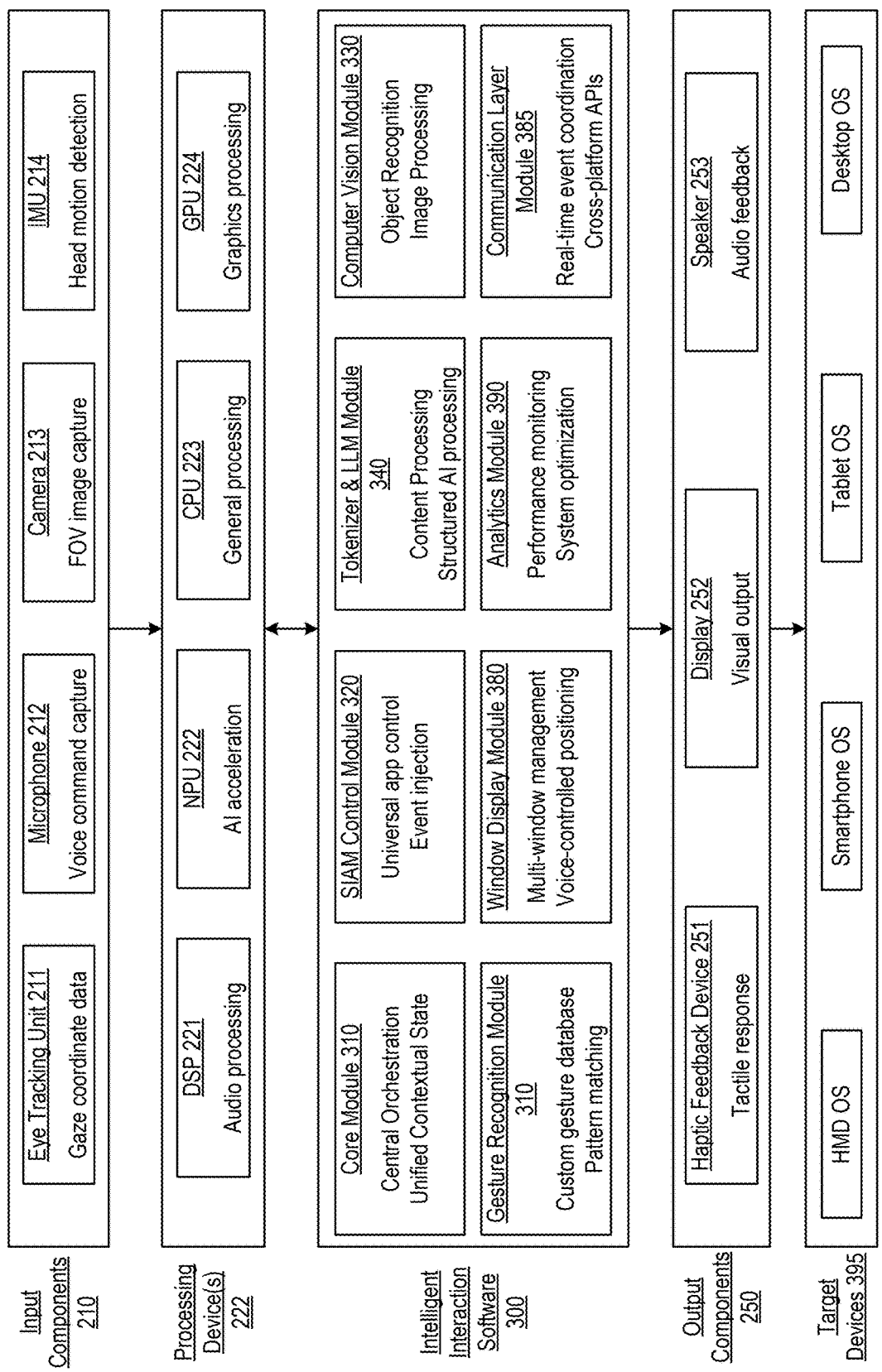
FIG. 4 is a high level flow architectural diagram illustrating the general operation of intelligent interaction software in conjunction with hardware components of computing device, in accordance with some implementations of the disclosure.

FIG. 4 is a high level flow architectural diagram illustrating the general operation of intelligent interaction software 300 in conjunction with hardware components of computing device 200, in accordance with some implementations of the disclosure.

Figure 5:
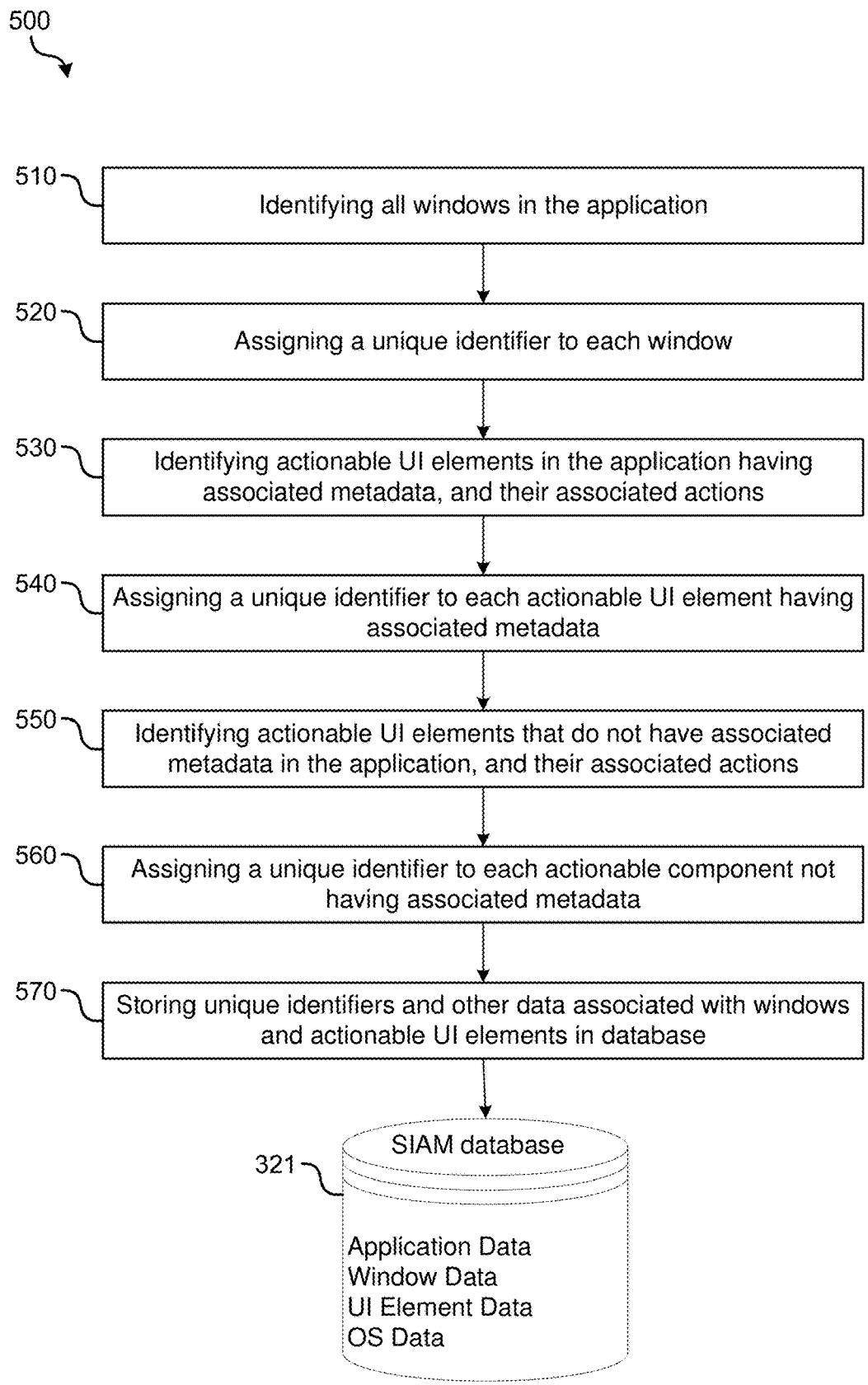
FIG. 5 is a flow diagram illustrating example operations of a method that can be implemented by a scraper to scrape any application to create a database schema of all actional UI components associated with the application, in accordance with some implementations of the disclosure

FIG. 5 is a flow diagram illustrating example operations of a method 500 that can be implemented by a scraper 323 of SIAM control module 320 to scrape any application to create a database schema of all actional UI components associated with the application, in accordance with some implementations of the disclosure. In some implementations, the method of FIG. 5 can be implemented each time intelligent interaction software 300 encounters a new application or new version of an application. In implementations where the intelligent interaction software 300 encounters a new version of an application, some of the database schema previously created for a different version can be reutilized to the extent windows and/or applications are implemented in the same way in the new application version (e.g., by applying data deduplication and lookup techniques).

Operation 510 includes identifying all windows in the application. Examples of windows that can be identified include:
- primary application windows (e.g., main CAD 3D View, document editing area, video display area),
- secondary application windows (e.g., settings panels, preferences dialogs, help documentation viewers, workflow steps),
- floating toolbars and context-sensitive menus that appear based on user action,
- system notification windows and modal dialogs that require user acknowledgment, and
- multi-document interfaces with tabbed content areas, split-screen views, and picture-in-picture overlays.

Detailed identification and classification of all interface containers, and their contextual relationships can be made. For example, in some implementations, to perform application context analysis, the specific application, application type (e.g., native mobile application, web application, desktop software, progressive web app), and the current application state (e.g., logged in, document open, specific workflow active) can be identified.

In some implementations, each interface container can be classified by its functional purpose and technical implementation. For example, in the ANDROID OS, Views and Fragments can be identified and cataloged separately, with Views representing complete screen interfaces and Fragments representing modular interface components that can be embedded within Views. Web-based interfaces can be analyzed to distinguish between primary page content, embedded iframes, modal overlays, and dynamic content areas loaded through JavaScript.

Operation 520 includes assigning a unique identifier to each window. In some implementations, each identified window can receive a persistent unique identifier that remains consistent across application sessions, device orientations, and interface state changes, enabling reliable voice and gesture targeting. In some implementations, hashing techniques can be implemented to generate the unique identifier.

Operation 530 includes identifying actional UI elements in the application having associated metadata, and their associated actions. To this end, comprehensive analysis of interactive elements within each identified window can be performed, identifying both their functional capabilities and their spatial relationships within the interface.

In some implementations, operation 530 includes identifying interactive elements that include proper accessibility metadata such as buttons with aria-labels, form input fields with placeholder text and validation requirements, navigation elements with role definitions, and multimedia controls with descriptive text. Each element's purpose, current state (enabled, disabled, selected, expanded), and available interactions can be identified and cataloged.

In some implementations, operation 530 includes determining the display layering of each element, identifying what elements appear in front of or behind others. This can include standard interface elements at the base layer, floating elements like tooltips and context menus at intermediate layers, and modal dialogs or system alerts at the top layer. This can also include identifying popup windows, dropdown menus, and overlay interfaces that temporarily obscure other content.

In some implementations of operation 530, each element can be analyzed to determine its accessibility support level and the range of gestures it can process. Elements can be classified as fully accessible (complete keyboard and voice navigation support), partially accessible (basic interaction possible but limited functionality), or non-accessible (requires alternative interaction methods). The system can identify available gesture interactions including tap, double-tap, long press, drag and drop, pinch-to-zoom support, and multi-touch capabilities.

In some implementations of operation 530, the system can record the precise coordinate positioning of each element, its size dimensions, and its spatial relationships to other interface components. This information can enable accurate voice targeting commands like "tap the button to the right of the search field" or "long press the third item in the list."

Operation 540 includes assigning a unique identifier to each actional UI element having associated metadata. Each UI element with associated metadata can receive a structured identifier that combines its functional purpose, spatial location, and interaction capabilities. This can enable precise voice and gesture targeting. In some implementations, hashing techniques can be implemented to generate the unique identifier.

Operation 550 includes identifying actionable UI elements that do not have associated metadata in the application, and their associated actions. This operation can identify and catalog actionable interface elements that lack explicit metadata but can still be controlled through operating system events and gesture injection.

In some implementations of operation 550, system identifies elements that can be manipulated through OS-level interactions including window controls (e.g., minimize, maximize, close buttons), scroll bars and resize handles, system menu triggers, and/or notification dismissal areas. Although these elements often lack application-specific metadata, they can respond reliably to standard system gestures.

Operation 560 includes assigning a unique identifier to each actionable component not having associated metadata. In some implementations, elements without explicit metadata can receive identifiers based on their visual characteristics, spatial positioning, and inferred functionality, enabling voice control through descriptive targeting. In some implementations, hashing techniques can be implemented to generate the unique identifier.

Operation 570 includes storing the unique identifiers and other data associated with windows and actionable UI elements in a SIAM database 321.

In some implementations, the system can perform comprehensive analysis of touch gesture capabilities for each identified, actionable UI element. This can include basic touch interactions (e.g., tap, double-tap, long press), directional gestures (e.g., swipe up, down, left, right for navigation or dismissal), manipulation gestures (e.g., drag to reposition, pinch and spread for zoom control, two-finger rotation for orientation changes), and/or complex multi-touch operations (e.g., three-finger swipe for system navigation, four-finger pinch for application switching, edge swipes for system panel access).

In some implementations, the system can determine what touch gestures are appropriate for each element based on the element type and current application context. For example, image viewing areas can support pinch-to-zoom and rotation gestures, text editing fields support selection and cursor positioning gestures, and list interfaces support scrolling and item selection gestures.

In some implementations, when multiple gesture interpretations are possible for a single interface element, the system can establish priority hierarchies and context-dependent gesture mappings to ensure reliable and predictable interaction results.

In some implementations, all collected information about windows, UI elements, spatial relationships, gesture capabilities, and/or interaction possibilities can be stored in the SIAM database 321. In addition, information about the application (e.g., application type, name, status, and/or version number) can be stored in the SIAM database 321. The database can support universal application control, enabling users to interact with any application through voice commands, head movements, and gesture inputs without requiring any application-specific programming or setup procedures.

In some implementations, the database structure includes cross-reference tables that link visual descriptions to functional capabilities, spatial coordinate systems that enable precise gesture targeting, and learning algorithms that improve gesture recognition and command interpretation based on user interaction patterns and feedback. In some implementations, a structural map of interface hierarchy can be created that identifies parent-child relationships between containers, sibling relationships between interface elements at the same level, and dependency relationships where one interface element controls the visibility or behavior of another.

As illustrated, the SIAM control module 320 can implement a systematic approach to analyzing and cataloging application interfaces that goes far beyond traditional accessibility scanning. This process can create a comprehensive database of interaction possibilities that enables universal voice and gesture control of any application without requiring specialized programming or developer cooperation.

Figure 6:
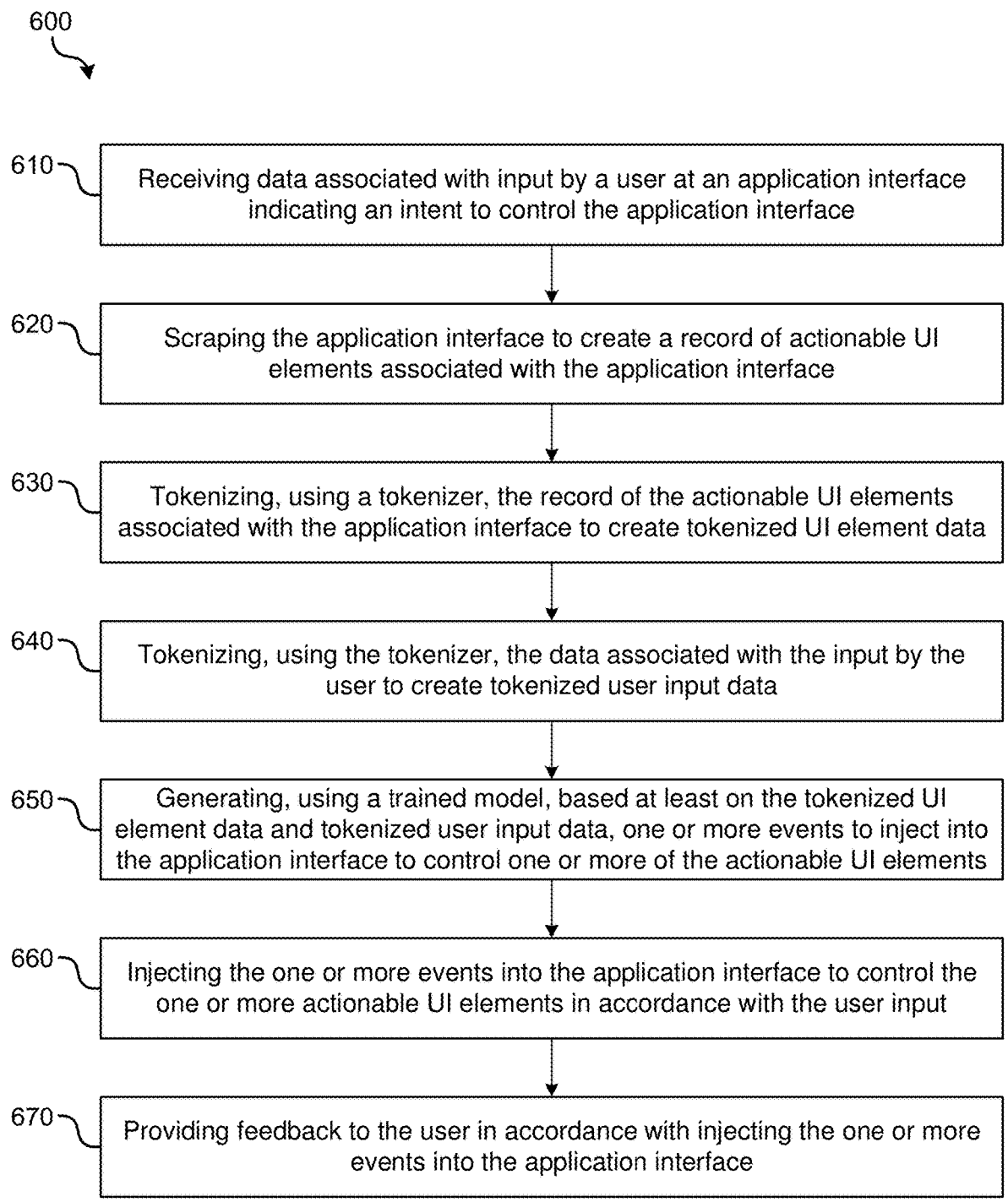
FIG. 6 is a flow diagram illustrating example operations of a method that can be implemented by intelligent interaction software to provide universal application control, in accordance with some implementations of the disclosure.

FIG. 6 is a flow diagram illustrating example operations of a method 600 that can be implemented by intelligent interaction software 300 to provide universal application control, in accordance with some implementations of the disclosure. The operations of method 600 can be implemented using one or more modules of intelligent interaction software 300 such as SIAM control module 320 and tokenizer and LLM module 340. In some implementations, one or more processing device(s) 220 can execute instructions stored in one or more CRM 230 to implement method 600.

Operation 610 includes receiving data associated with input by a user at an application interface indicating an intent to control the application interface. For example, in some implementations, the data comprises a voice command input collected by receiving, via a microphone 212, a vocal command from the user to control the application interface; and converting the vocal command to vocal command text. The vocal command text can be in a natural language such as "move to the left" or "zoom in". In some implementations, the data comprises user motion data collected in response to an IMU 214 detecting head motion of the user, or user gaze data collected in response to the eye tracking unit 211 detecting eye motion of the user. The head motion or eye motion data can indicate an intent to navigate or change a view of the application interface. In some implementations, the data comprises hand/arm motion data collected by a touch sensor or camera in response to a user performing hand gestures. This hand/arm motion data can similarly indicate an intent to navigate or change a view of the application interface.

In some implementations, the data associated with input by a user at an application interface indicating an intent to control the application interface can be synchronously collected from multiple input components 210 as described above. In such implementations, the data can be fused using a trained multimodal fusion model. Prior to fusion, the data can be synchronized in time.

Operation 620 includes scraping the application interface to create a record of actionable UI elements associated with the application interface. For example, scraping the application interface to create the record of the actionable UI elements associated with the application interface can include identifying an actionable UI element that does or does not have associated metadata in the application interface; identifying an action associated with the actionable UI element; assigning a unique identifier to the actionable UI element; and storing, in a datastore, the unique identifier and the action associated with the actionable UI element. Particular techniques for implementing operation 620 are further described above with reference to method 500.

Operation 630 includes tokenizing, using a tokenizer 350, the record of the actionable UI elements associated with the application interface to create tokenized UI element data. As noted above, when an application interface is scraped (e.g., using SIAM control module 320), it can capture visible elements (e.g., buttons, text fields, menus) and/or their metadata (e.g., accessibility labels, coordinate positions, interaction capabilities). In such implementations, the tokenizer 350 can convert this structural information (e.g., as stored in SIAM database 321) into standardized tokens. By way of particular example, the tokenizer can create standardized tokens such as:
[BUTTON:email_settings:x:245:y:180:action:click]
[TEXTFIELD:search_query:placeholder:"Enterkeywords":editable:true]
[MENU:navigation:items:5:expandable:true]

In some implementations, tokenizing the record of the actionable UI elements comprises analyzing spatial relationships and semantic connections between UI elements (e.g., as stored in SIAM database 321), and creating relational tokens that describe interface hierarchy and user flow patterns. By way of particular example, the tokenizer can create relational tokens such as:
[CONTEXT:email_app:current_screen:settings:related_actions:save,cancel, reset]
[WORKFLOW:user_intent:configure_email:required_steps:3:estimated_time:2 min]

In some implementations, operation 620 and/or operation 630 can be skipped. For example, These operations may have already been performed during prior use of the application by the user, or during initialization of the application (e.g., before receiving input from the user). In such cases, the already tokenized UI element data can be directly obtained from a datastore (e.g., a token database maintained by tokenizer 350).

Operation 640 includes tokenizing, using the tokenizer 350, the data associated with the input by the user to create tokenized user input data. Voice commands, IMU data, eye gesture data, and/or other user input data can be tokenized into tokenized user input data. In some implementations, the data can be fused prior to tokenization.

In some implementations, voice commands can be converted into spatial manipulation tokens that specify precise geometric operations. By way of particular example, when a user says "rotate the motor 45 degrees clockwise," the tokenizer 350 can create the following tokens:
[VOICE_COMMAND:rotate:target:motor_assembly:axis: z:angle:45:direction:clockwise:o rigin:center]
[SPATIAL_ACTION:rotation_transform:current_state:captured:target_state:calculated:a nimation:smooth]

In some implementations, IMU data corresponding to head movements can be tokenized into spatial manipulation commands that correspond to specific geometric operations. By way of particular example, such tokens created from IMU data can be:
[IMU_GESTURE:head_tilt:direction:right:amplitude: 15deg:duration:800 ms:intent:rotate_object]
[MOTION_MAPPING:tilt_right:spatial_action:rotate_y_ positive:scaling_factor:3.0:accele ration_curve:smooth]

In some implementations, the tokenizer 350 can create cross-reference tokens that ensure voice commands, head movements, and touch gestures produce equivalent spatial manipulations. By way of particular example, such cross-reference tokens can include:
[EQUIVALENT_ACTIONS:voice:"zoom in":imu:forward_head_motion:touch:pinch_spread: spatial_result:scale_increase]
[GESTURE_SEMANTIC:pan_view:voice:"move left":head:left_tilt:touch:drag_left:coordinate_delta:x:−50]

Operation 650 includes generating, using a trained model, based at least on the first set of tokens and the second set of tokens, one or more events to inject or transmit into the application interface to control one or more of the actionable UI elements. The trained model can be an LLM that locally runs on the device or system on which method 600 is implemented.

Each event to be injected can be associated with an action. It can also have associated coordinates on the display where the action is implemented.

In some implementations, a plurality of events can be generated. The plurality of events can include events that can be initiated by an OS on which the application interface runs, and is not interpretable by the application interface and/or events that can be interpreted by the application interface.

Operation 660 includes injecting the one or more events into the application interface to control the one or more actionable UI elements in accordance with the user input.

Operation 670 includes providing feedback to the user in accordance with injecting the one or more events into the application interface. The feedback can be provided via one or more output components 250 such as haptic feedback device 251, display 252, or speaker 253. In some implementations, providing the feedback includes presenting, on the display, an updated rendering of the application interface in response to controlling the one or more actionable UI elements. In some implementations, providing the feedback includes providing a multimodal feedback including displaying the updated rendering of the application interface, playing sound on a speaker, or delivering haptic feedback to the user.

Figure 7:
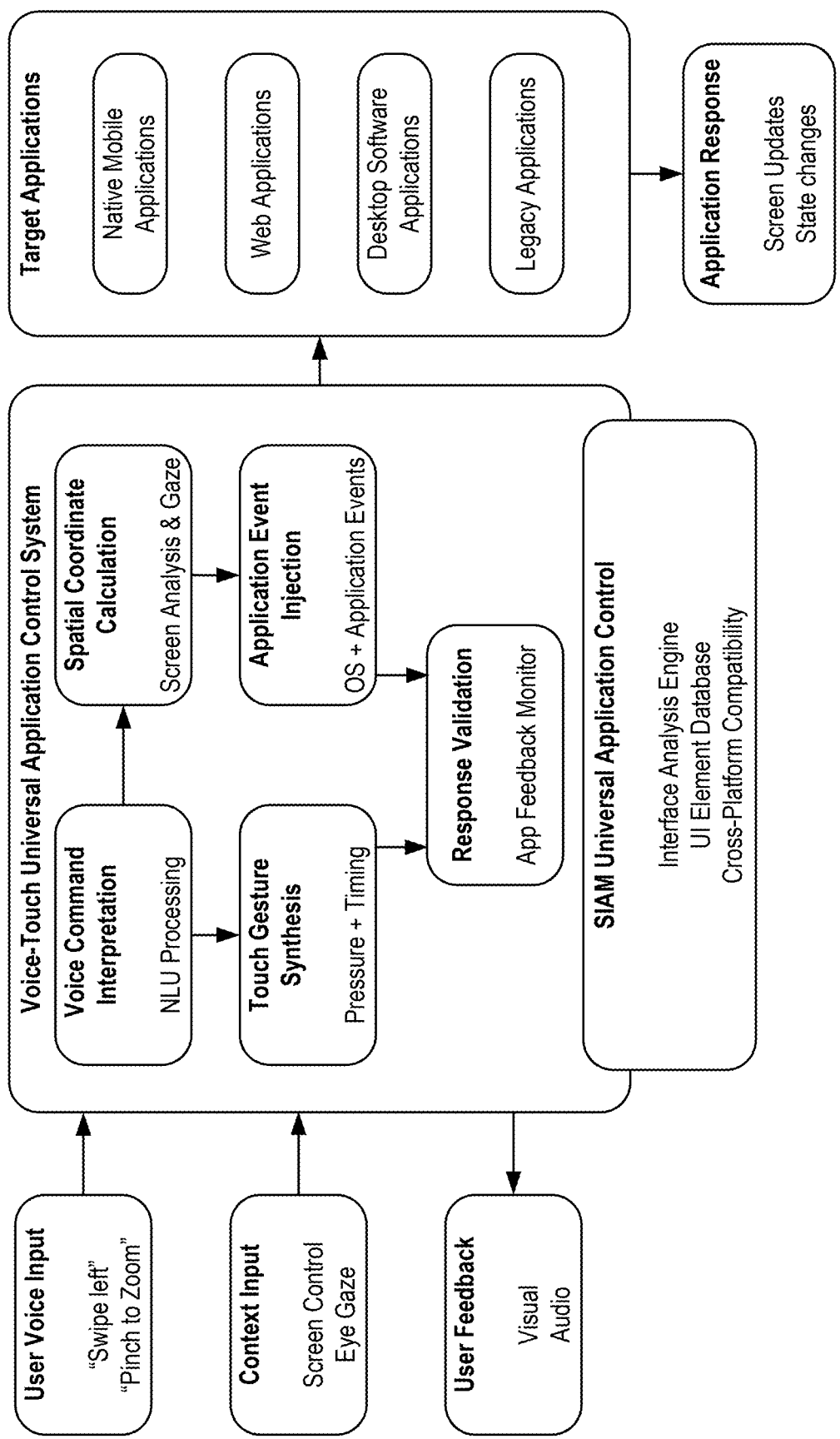
FIG. 7 is a high-level flow diagram illustrating an example flow of operations that can be implemented to provide universal application control via a voice-touch universal application control system, in accordance with some implementations of the disclosure.

FIG. 7 is a high-level flow diagram illustrating an example flow of operations that can be implemented to provide universal application control via a voice-touch universal application control system, in accordance with some implementations of the disclosure. FIG. 8 depicts example voice commands that can interpreted into an action at an application by the universal application control system of FIG. 7, in accordance with some implementations of the disclosure. Multiple explicit (e.g., developer allowed) and non-explicit (e.g., OS-allowed) gestures can be combined to create gestures based on voice control that were not originally envisioned by the software application developer. As depicted by the example of FIG. 7, the universal application control system can receive various inputs, include voice commands and/or head motion data, and provide various functionalities including: voice command interpretation via NLU processing, spatial coordinate calculation, touch gesture synthesis, application event injection, and/or response validation. The universal application control system can control and induce a response in a variety of different target applications including native mobile apps, web apps, desktop software apps, and legacy apps.

Figure 9:
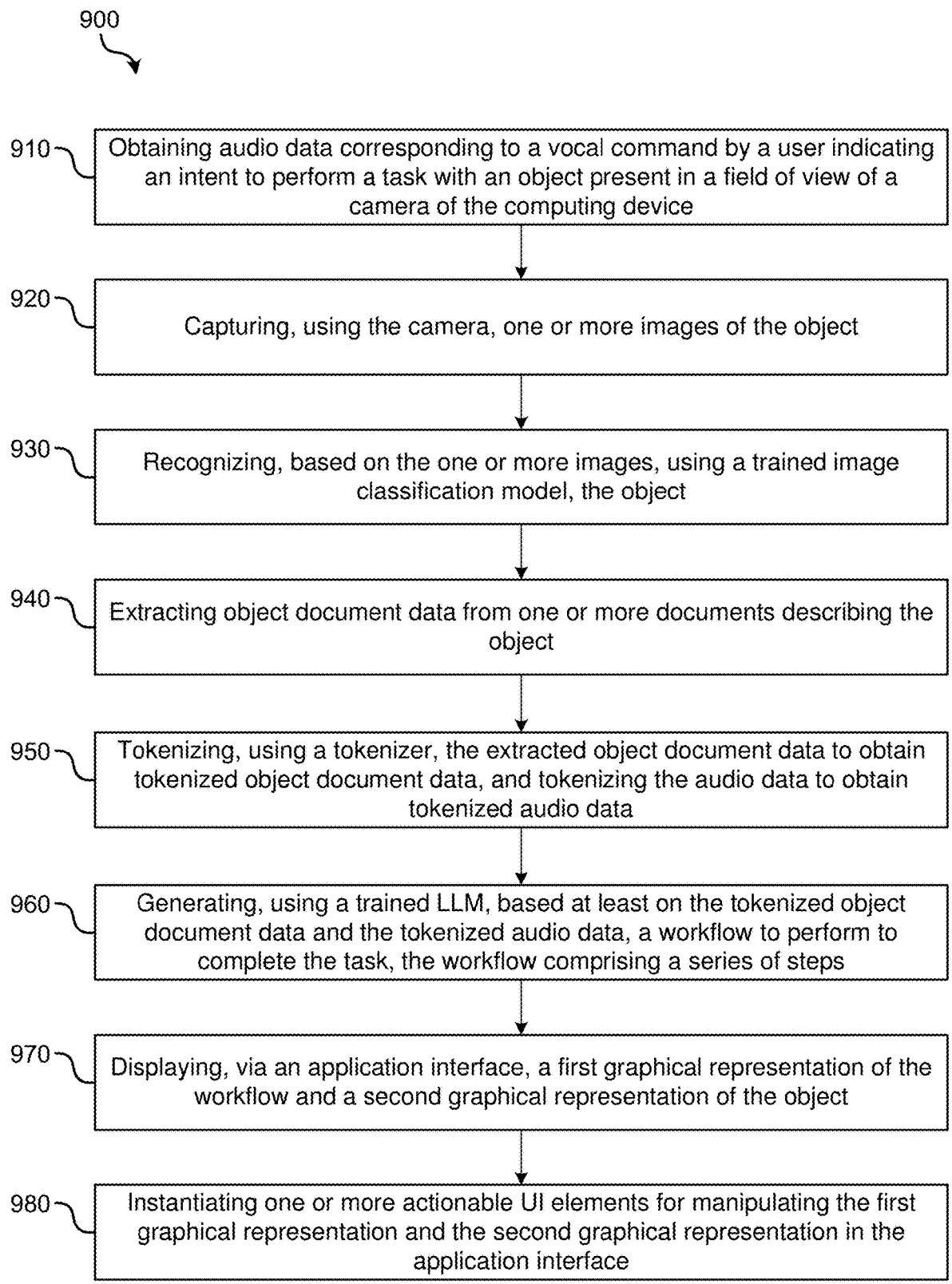
FIG. 9 is a flow diagram illustrating example operations of a method that can be implemented by intelligent interaction software to generate an intelligent workflow and provide user interaction with the workflow, in accordance with some implementations of the disclosure.

FIG. 9 is a flow diagram illustrating example operations of a method 900 that can be implemented by intelligent interaction software 300 to generate an intelligent workflow and provide user interaction with the workflow, in accordance with some implementations of the disclosure. The operations of method 900 can be implemented using one or more modules of intelligent interaction software 300 such as computer vision module 330, SIAM control module 320 and tokenizer and LLM module 340. In some implementations, one or more processing device(s) 220 can execute instructions stored in one or more CRM 230 to implement method 900.

Operation 910 includes obtaining audio data corresponding to a vocal command by a user indicating an intent to perform a task with an object present in a field of view of a camera 213 of the computing device. For example, as depicted in the example of FIG. 1, a user wearing HMD 100 that has equipment 140 in their line of sight can issue a natural voice command indicating an intent to repair equipment 140. The voice command can be recorded using microphone 212 and converted to textual data via ADC 212a and a speech-to-text converter to obtain the audio data.

Operation 920 includes capturing, using the camera 213, one or more images of the object.

Operation 930 includes recognizing, based on the one or more images, using a trained image classification model, the object. The trained image classification model can be a trained zero-shot image classification model.

Operation 940 includes extracting object document data from one or more documents describing the object. In some implementations, the documents can be obtained from a local storage of device or system implementing method 900. In some implementations, the documents can be obtained from the Internet using network interface 240.

Operation 950 includes tokenizing, using a tokenizer 350, the extracted object document data to obtain tokenized object document data, and tokenizing the audio data to obtain tokenized audio data.

In some implementations, the tokenizer 350 is configured to process manual content associated with the identified equipment and create structured knowledge tokens from the manual content. For example, in particular implementations the structured knowledge tokens can be:
[EQUIPMENT:acme_coffee_maker_x:category:appliance: repair_complexity:medium]

[PROCEDURE:leak_repair:steps:4:tools_required:screwdriver,sealant:safety_level:low]
[COMPONENT:water_reservoir:location:top_left:common_issues:seal_degradation,over flow]

In some implementations, tokenizer 350 is configured to creates spatial tokens that connect equipment components to their physical locations and manipulation requirements. For example, in particular implementations the spatial tokens can be:
[COMPONENT_SPATIAL:water_reservoir:3d_location:x: 120:y:45:z:200:access_angle:top_down:tool_clearance:15 mm]
[MANIPULATION_SEQUENCE:reservoir_removal: step_1:rotate_counterclockwise:90deg: step_2:lift_vertical: 25 mm]
[VISUAL_REFERENCE:component_highlight: bounding_box:x:100:y:40:w:50:h:30:color:ye llow:opacity: 0.7]

Operation 960 includes generating, using a trained LLM 360, based at least on the tokenized object document data and the tokenized audio data, a workflow to perform to complete the task, the workflow comprising a series of steps. The LLM 360 can be configured to run locally on the device or system which method 900 is implemented. The LLM 360 can be configured to use the tokens generated by the tokenizer 350 to generate consistent, contextually appropriate workflow steps. For example, in one particular implementation, the following output generation can be created in response to input tokens generated by the token:
input tokens:[USER_INTENT:fix_leak]+ [EQUIPMENT: coffee_maker]+[VISUAL_CONTEXT:water_visible]
Output generation:"Step 1:Unplug device [SAFETY:electrical] Step 2:Locate water reservoir [COMPONENT:top_left] Step 3:Inspect seal [VISUAL_CHECK:deterioration]"

The aforementioned tokenization approach can ensure that regardless of the user's input natural language (e.g., whether a user says "Fix the motor," points at a broken component, asks "What's step 3?", or uses head movements to navigate through 3D repair diagrams), the LLM 360 maintains consistent understanding and provides coherent responses based on the established token relationships. The spatial tokenization can enable users to manipulate 3D content, documents, and media through voice commands or head movements with the same precision and reliability as traditional touch or mouse interactions.

Operation 970 includes displaying, via an application interface, a first graphical representation of the workflow and a second graphical representation of the object.

Operation 980 includes instantiating one or more actionable UI elements for manipulating the first graphical representation and the second graphical representation in the application interface. For example, SIAM control module 320 can dynamically generate interaction UI elements for each workflow step that is created, creating virtual buttons, injectable gestures, progress indicators, and navigation controls that respond to voice commands, head movements, and/or physical gestures. These generated UI elements can be native components of the intelligent interaction software 300, and a user can interact with them to manipulate the application interface that is presented.

In some implementations, native UI elements can be created for workflow steps. The self-generated UI elements can be registered internally by the intelligent interaction software 300. In this embodiment, during interaction with the UI, an internal virtual event bus can be used to handle injection of commands to manipulate the self-generated UI elements, and standardized workflow tokens can be used to handle command interpretation.

As used herein, the term "augmented reality" or "AR" generally refers to presenting digital information to a user that is directly registered to the user's physical, real-world environment such that the user may interact with it in real time. The digital information may take the form of images, sound, video, text, haptic feedback, olfactory feedback, or other forms. For example, the digital information may appear as a three-dimensional object that is overlaid over the user's physical environment in real-time, or as an audio commentary. As described herein, the term "augmented reality" may be used interchangeably with the term "mixed reality."

As used herein, the term "virtual reality" or "VR" generally refers to placing a user within (e.g., displaying) a completely computer-generated environment.

The technology described herein addresses some critical limitations in current interaction methods for AR/VR systems. The UI voice-touch approach described herein can offer a hands-free, energy-efficient, and/or universally accessible interface that can adapt to a wide range of devices and use cases. This can provide significant advances in the next generation of human-computer interaction systems.

In addition, the technology described herein can operate entirely offline while providing sophisticated AI-driven interactions, addressing growing privacy concerns in the digital age. In some implementations, by processing all data on-device and implementing advanced cryptographic techniques, the intelligent interaction software described herein can ensure that users maintain complete control over their personal information.

Furthermore, in some implementations, the adaptive learning capabilities of intelligent interaction software described herein may allow it to continuously improve and personalize its performance for individual users, while its modular architecture can ensure that it can easily incorporate future technological advancements.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, NPU, APU, DSP, FPGA, ASIC, SOC, and/or other processing circuitry.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. One or more non-transitory computer readable mediums storing instructions that, when executed by one or more processors of a system, cause the system to perform operations comprising:
    obtaining data associated with an input by a user at an application interface indicating an intent to control the application interface;
    tokenizing, using a tokenizer, the data associated with the input by the user to create tokenized user input data;
    obtaining tokenized user interface (UI) element data corresponding to a tokenized record of actionable UI elements associated with the application interface;
    generating, using a trained large language model (LLM), based at least on the tokenized UI element data and the tokenized user input data, one or more events to inject into the application interface to control one or more of the actionable UI elements;
    injecting the one or more events into the application interface to control the one or more actionable UI elements in accordance with the input by the user; and
    providing feedback to the user in accordance with injecting the one or more events into the application interface,
    wherein obtaining the tokenized UI element data corresponding to the tokenized record of actionable UI elements associated with the application interface comprises:
        scraping the application interface to create a record of the actionable UI elements associated with the application interface; and
        tokenizing, using the tokenizer, the record of the actionable UI elements associated with the application interface to create the tokenized UI element data.

2. The one or more non-transitory computer readable mediums of claim 1, wherein scraping the application interface to create the record of the actionable UI elements associated with the application interface comprises:
    identifying a first actionable UI element that does not have associated metadata in the application interface;
    identifying an action associated with the first actionable UI element;
    assigning a unique identifier to the first actionable UI element; and
    storing, in a datastore, the unique identifier and the action associated with the first actionable UI element.

3. The one or more non-transitory computer readable mediums of claim 2, wherein the first actionable UI element is a UI element that can be invoked via an accessibility service of an operating system on which the application interface runs.

4. The one or more non-transitory computer readable mediums of claim 1, wherein:
the operations further comprise:
receiving, using a microphone of the system, a vocal command from the user to control the application interface; and
converting the vocal command to vocal command text; and
obtaining the data associated with input by the user comprises obtaining the vocal command text.

5. The one or more non-transitory computer readable mediums of claim 4, wherein:
the data associated with the input by the user is fused input data; and
obtaining the data associated with input by the user further comprises:
obtaining user motion data in response to an inertial measurement unit (IMU) of the system detecting head motion of the user, or obtaining user gaze data in response to an eye tracking unit of the system detecting eye motion of the user; and
fusing the vocal command text with the user motion data or the user gaze data to obtain the fused input data.

6. The one or more non-transitory computer readable mediums of claim 1, wherein
the one or more events to inject into the application interface to control one or more of the actionable UI elements comprise a plurality of events to inject into the application interface to control a plurality of the actionable UI elements; and
injecting the one or more events into the application interface comprises: injecting the plurality of events into the application interface to control the plurality of actionable UI elements in accordance with the input by the user.

7. The one or more non-transitory computer readable mediums of claim 6, wherein:
the plurality of events comprise a first event that is initiated by an operating system on which the application interface runs, and is not interpretable by the application interface; and
injecting the plurality of events comprises injecting, via the operating system, the first event into the application interface.

8. The one or more non-transitory computer readable mediums of claim 7, wherein:
the plurality of events further comprise a second event that is interpretable by the application interface; and
injecting the plurality of events further comprises injecting, via the application interface, the second event into the application interface.

9. The one or more non-transitory computer readable mediums of claim 5, wherein the system is a head mounted display system.

10. The one or more non-transitory computer readable mediums of claim 1, wherein the tokenizer and the trained LLM are configured to run locally on the system.

11. The one or more non-transitory computer readable mediums of claim 1, wherein providing feedback to the user in accordance with injecting the one or more events into the application interface comprises: presenting, on a display of the system, an updated rendering of the application interface in response to controlling the one or more actionable UI elements.

12. The one or more non-transitory computer readable mediums of claim 11, wherein providing the feedback to the user in accordance with injecting the one or more events into the application interface further comprises: playing sound on a speaker of the system, or delivering haptic feedback to the user using a haptic feedback device of the system.

13. A method, comprising:
obtaining data associated with an input by a user at an application interface indicating an intent to control the application interface;
tokenizing, using a tokenizer, the data associated with the input by the user to create tokenized user input data;
obtaining tokenized user interface (UI) element data corresponding to a tokenized record of actionable UI elements associated with the application interface;
generating, using a trained large language model (LLM) model, based at least on the tokenized UI element data and the tokenized user input data, one or more events to inject into the application interface to control one or more of the actionable UI elements;
injecting the one or more events into the application interface to control the one or more actionable UI elements in accordance with the input by the user; and
providing feedback to the user in accordance with injecting the one or more events into the application interface,
wherein obtaining the tokenized UI element data corresponding to the tokenized record of actionable UI elements associated with the application interface comprises:
scraping the application interface to create a record of the actionable UI elements associated with the application interface; and
tokenizing, using the tokenizer, the record of the actionable UI elements associated with the application interface to create the tokenized UI element data.

14. One or more non-transitory computer readable mediums storing instructions that, when executed by one or more processors of a system, cause the system to perform operations comprising:
obtaining audio data corresponding to a vocal command by a user indicating an intent to perform a task with an object present in a field of view of a camera of the system;
capturing, using the camera, one or more images of the object;
recognizing, based on the one or more images, using a trained image classification model, the object;
tokenizing, using a tokenizer, the audio data to obtain tokenized audio data;
obtaining tokenized object document data corresponding to a tokenized record of object document data obtained from one or more documents describing the object;
generating, using a trained large language model (LLM), based at least on the tokenized object document data and the tokenized audio data, a workflow to perform to complete the task, the workflow comprising a series of steps; and
displaying, via an application interface, a first graphical representation of the workflow and a second graphical representation of the object.

15. The one or more non-transitory computer readable mediums of claim 14, wherein the operations further comprise: instantiating one or more actionable UI elements for manipulating the first graphical representation and the second graphical representation in the application interface.

16. The one or more non-transitory computer readable mediums of claim 15, wherein the operations further comprise:

obtaining multimodal user input data associated with multimodal input by the user at the application interface indicating an intent to control the one or more actionable UI elements; and processing the multimodal user input data to provide feedback to the user, the feedback comprising: presenting, on a display, an updated rendering of the application interface.

17. The one or more non-transitory computer readable mediums of claim 16, wherein the obtaining the multimodal user input data comprises processing a natural language voice command by the user.

18. The one or more non-transitory computer readable mediums of claim 15, wherein obtaining the tokenized object document data comprises:

extracting the object document data from one or more documents describing the object; and tokenizing the object document data that was extracted to obtain the tokenized object document data.

19. The one or more non-transitory computer readable mediums of claim 18, wherein the tokenized object document data comprises spatial tokens relating one or more equipment components to one or more respective physical locations.

* * * * *